United States Patent
Kim

(10) Patent No.: US 11,584,344 B2
(45) Date of Patent: Feb. 21, 2023

(54) METHOD AND SYSTEM OF CONTROLLING BRAKING OF VEHICLE

(71) Applicants: Hyundai Motor Company, Seoul (KR); Kia Motors Corporation, Seoul (KR)

(72) Inventor: Gwi Chul Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 137 days.

(21) Appl. No.: 16/879,495

(22) Filed: May 20, 2020

(65) Prior Publication Data
US 2021/0229646 A1    Jul. 29, 2021

(30) Foreign Application Priority Data
Jan. 23, 2020    (KR) ........................ 10-2020-0009425

(51) Int. Cl.
| | | |
|---|---|---|
| G06F 7/00 | (2006.01) | |
| B60T 8/1766 | (2006.01) | |
| B60T 8/17 | (2006.01) | |
| B60T 8/26 | (2006.01) | |
| B60T 8/1755 | (2006.01) | |
| B60T 8/1769 | (2006.01) | |
| B60T 8/1761 | (2006.01) | |
| B60T 8/32 | (2006.01) | |

(52) U.S. Cl.
CPC ........ *B60T 8/17551* (2013.01); *B60T 8/1761* (2013.01); *B60T 8/1769* (2013.01); *B60T 8/322* (2013.01); *B60T 8/3215* (2013.01); *B60T 2270/12* (2013.01); *B60T 2270/602* (2013.01)

(58) Field of Classification Search
None
See application file for complete search history.

(56) References Cited

U.S. PATENT DOCUMENTS

| | | | | |
|---|---|---|---|---|
| 5,019,985 A | * | 5/1991 | Yasuno | B60K 23/08 701/84 |
| 7,572,201 B2 | * | 8/2009 | Supina | B60L 50/61 475/5 |
| 2010/0187024 A1 | * | 7/2010 | Tang | B60L 50/52 701/22 |
| 2012/0325573 A1 | * | 12/2012 | Miller | B60L 50/16 180/282 |

FOREIGN PATENT DOCUMENTS

KR    101996755 B1    7/2019

* cited by examiner

*Primary Examiner* — Adam D Tissot
(74) *Attorney, Agent, or Firm* — Fox Rothschild LLP

(57) ABSTRACT

A method of controlling braking of a vehicle is provided. When a disconnector is disconnected and an auxiliary drive wheel is separated from a driving system, vehicle braking is performed with regenerative braking by a primary drive wheel motor during braking. Subsequently, the disconnector is connected based on a vehicle stability state, and then, braking is performed simultaneously on the auxiliary drive wheel and a primary drive wheel.

13 Claims, 14 Drawing Sheets

METHOD AND SYSTEM OF CONTROLLING BRAKING OF VEHICLE

CROSS REFERENCE TO RELATED APPLICATION

The present application claims priority to Korean Patent Application No. 10-2020-0009425, filed Jan. 23, 2020, the entire contents of which is incorporated herein for all purposes by this reference.

BACKGROUND

Field of the Disclosure

The present disclosure relates to a method and system of controlling braking of a vehicle, and more particularly, a method and system of controlling braking of a vehicle that is equipped with a disconnector for reducing drag loss on the drive wheel side and a driving unit having a regenerative control function.

Description of the Related Art

In recent years, four-wheel-drive (4WD) electric vehicles that are each equipped with an independent drive device for front wheels and an independent drive device for rear wheels have been developed. The drive devices in the four-wheel-drive electric vehicle are capable of being driven individually or together according to a driving environment condition. All the drive devices for the front and rear wheels may be motors that operate on battery power. In particular, the four-wheel-drive electric vehicles are electric vehicles that are each equipped with an independent drive motor for front wheels and an independent drive motor for rear wheels, that is, with a front wheel drive motor and a rear wheel drive motor.

Typical four-wheel-drive electric vehicles are driven in a two-wheel drive (2WD) mode, as a basic drive mode, in which torque is provided to one axle for either two front wheels or two rear wheels, and, when a drive force is insufficient, are driven in a four-wheel drive (4WD) mode in which toque is provided to two axles for two front wheels and two rear wheels. FIGS. 1A and 1B are diagrams of the prior art, each illustrating a four-wheel-drive (4WD) equipped with a front wheel drive motor, a rear wheel drive motor, and a disconnector. FIG. 2 is a diagram of the prior art that more specifically illustrates a configuration of a power train on the auxiliary drive wheel side and a state where driving-system components are arranged, in the four-drive-wheel electric vehicle that is illustrated in FIGS. 1A and 1B.

FIGS. 1A and 1B, show that the four-wheel-drive electric vehicle is equipped with a front wheel drive motor ("front wheel motor") 2 for driving front wheels 1 and a rear wheel drive motor ("rear wheel motor") 8 for driving rear wheels 7. As described above, the four-wheel-drive electric vehicle may be driven in any one of the four-wheel-drive (4WD) mode and the two-wheel-drive (2WD) mode. A drive motor and drive wheels that are not in use when operating in the two-wheel-drive mode are predetermined.

In the four-wheel-drive electric vehicle equipped with the independent drive motors 2 and 8 for the front wheels and the rear wheels, if drive wheels that are not in use when driving in the two-drive-wheel mode are defined as auxiliary drive wheels, when the auxiliary drive wheels are not in use (e.g., when being driven in the 2WD mode) while being driven, a reverse drive force is transferred from the auxiliary drive wheels 1 to a decelerator 3, and thus drag loss may occur. Therefore, when driving in the two-wheel-drive mode, the transfer of the reverse drive force from the auxiliary drive wheels 1 has to be blocked, thereby preventing drag loss.

Accordingly, a disconnector 6 may be installed on a driving shaft 5 for the auxiliary drive wheels 1. In the vehicle in which disconnector 6 is installed, the disconnector 6 is connected on the driving shaft 5 to make a connection for motive power transfer when driving in the four-wheel-drive mode, and is disconnected (e.g., separated) on the driving shaft 5 to release the connection for motive power transfer when driving in the two-wheel-drive mode.

FIGS. 1A and 1B each illustrate the electric vehicle that is equipped with the front wheel disconnector 6. In the illustrated vehicle, the front wheels are auxiliary drive wheels. The front wheel disconnector 6 that makes or releases the connection for motive power transfer is disposed between the front wheel 1 that is the auxiliary drive wheel, and a front-wheel driving-system component, more specifically, between the front wheel 1 and a differential 4.

When the disconnector 6 is connected in the vehicle equipped with the front wheel disconnector 6, the vehicle is able to be driven in the four-wheel-drive mode. In a disconnected state of the front wheel disconnector 6, the vehicle is able to be driven in a rear wheel drive state. Accordingly, the disconnector 6 is selectively connected or disconnected, and thus the connection for motive power transfer on the driving shaft 5 may be made and released. At this time, the disconnector 6 connects between the auxiliary drive wheel 1 and the driving-system component, such as the decelerator 5, that transfers motive power, or releases the connection therebetween. The driving-system components here refers to components that generate or transfer a drive force for vehicle driving, and the disconnector 6 may be realized as a dog clutch.

FIG. 1A illustrates a state where the front wheel disconnector (the dog clutch) 6 is disconnected when driving in the two-wheel-drive (rear-wheel drive) mode. FIG. 1B illustrates a state where the front wheel disconnector (the dog clutch) 6 is connected when driving in the four-wheel-drive mode. From FIG. 2, a state where the driving-system components, such as the drive motor 2, the decelerator 3, and the differential 4, the disconnector (the dog clutch) 6, and the vehicle wheel 1 are coupled and arranged is shown. The vehicle wheel 1 here is an auxiliary drive wheel and may be a front wheel in the vehicle in FIGS. 1A and 1B.

The drive motor 2 in the electric vehicle is driven at a high speed when the vehicle is being driven. A speed of the drive motor 2 is reduced, by the decelerator 3 coupled to the drive motor 2, to a speed suitable for vehicle operation. A rotational force that results from the reduction of the speed by the decelerator 3 is transferred to the diving shaft 5 through the differential 4, and thus the vehicle is driven. On the other hand, optimal control technologies for regenerative braking of the four-wheel-drive electric vehicle equipped with the independent drive motor for the front-wheels, the independent drive motor for the rear-wheels, and the disconnector are necessary, but the optimal control technologies for the regenerative braking, which reflect characteristics of the four-wheel-drive electric vehicle equipped with the disconnector, have not yet been known.

For the four-wheel-drive electric vehicle equipped with the independent drive motor for the front-wheels, the independent drive motor for the rear-wheels, and the disconnector, a regenerative mode in which kinetic energy of the vehicle is recovered through each drive motor when the vehicle brakes (e.g., decelerates) or when the vehicle coasts with an inertia force, and in which a battery is thus charged with the resulting energy may also be performed. In the regenerative mode, when the kinetic energy of the vehicle is transferred to the drive motor through the drive wheel, the drive motor operates as a generator, and thus the battery in the vehicle is charged with the resulting energy through an inverter.

However, in the four-wheel-drive electric vehicle, when the disconnector is disconnected while the vehicle coasts after acceleration, drag loss due to the auxiliary drive wheel (e.g., the front wheel in examples in FIGS. 1A and 1B) may be prevented, thereby contributing to an improvement in vehicle fuel efficiency. Additionally, when a driver engages a brake pedal to perform braking in such a situation, the regenerative braking through the auxiliary drive wheel is not possible. In other words, when the disconnector is disconnected while the vehicle coasts, drag loss is prevented and thus a movement distance of the vehicle may be increased. However, when the brake pedal engaged while the disconnector is disconnected, the regenerative braking is possible only with the primary drive wheel (e.g., the rear wheel in the examples in FIGS. 1A and 1B), and the regenerative braking of the auxiliary drive wheel is not possible. Thus, an overall amount of vehicle regenerative braking is reduced, thereby decreasing fuel efficiency.

SUMMARY

An objective of the present disclosure is to provide a method of controlling braking of a vehicle that is equipped with an independent driving unit configured to drive front wheels, an independent driving unit configured to drive rear wheels, and a disconnector, the method being capable of ensuring the vehicle stability and braking performance and increasing an amount of regenerative braking, during braking, and thus contributing to an improvement in vehicle fuel efficiency.

According to an aspect of the present disclosure, a method of controlling braking of a vehicle that includes an independent driving unit configured to drive front wheels, an independent driving unit configured to drive rear wheels, and a disconnector installed in a driving shaft and may be configured to make and release a connection for motive power transfer, the control method may include: determining a current vehicle stability index based on pieces of information collected in the vehicle; connecting or disconnecting the disconnector based on the determined vehicle stability index; and performing regenerative braking for all the front and rear wheels of the vehicle or for either the front wheels or the rear wheels based on a control state of the disconnector. In the method, the vehicle may be a four-wheel-drive electric vehicle that has a front wheel motor and a rear wheel motor, as the driving units, and that has a disconnector installed on a front wheel driving shaft thereof.

According to another aspect of the present disclosure, a method controlling braking of a vehicle may include: determining whether a brake pedal is operated while the vehicle is being driven in a state where the disconnector is disconnected to release the connection for the motive power transfer; determining a current vehicle stability index based on pieces of information collected in the vehicle and comparing the determined vehicle stability index with a preset reference value, in response to determining that the brake pedal is operated, comparing a driver-required braking torque with a torque at which regenerative braking by the rear wheel motor is possible, which corresponds to a current vehicle speed, when the determined vehicle stability index is less than the preset reference value; and preforming the regenerative braking by the rear wheel motor and attaining the driver-required braking torque by generating only a rear-wheel regenerative braking torque, when the driver-required braking torque is equal to or less than the torque at which the regenerative braking by the rear wheel motor is possible.

Additionally, a calculation of the vehicle stability index may be executed from vehicle deceleration, an amount of rear wheel slipping, and a division ratio between a front wheel braking force and a rear wheel braking force, using Equation 1:

Vehicle stability index=Vehicle Deceleration× Amount of Rear Wheel Slipping×Division Ratio between Front Wheel Braking Force and Rear Wheel Braking Force wherein, the vehicle deceleration is current real-world vehicle deceleration that is measured using a sensor, and the division ratio between the front wheel braking and the rear wheels braking wheel is a value of a ratio of the front wheel braking force to the rear wheel braking force.

The torque at which the regenerative braking by the rear wheel motor is possible may be a value based on the current vehicle speed, and may be determined from a graph line showing the torque at which the regenerative braking by the rear wheel motor is possible. The method may further include connecting the disconnector when the determined vehicle stability index is at or greater than the reference value; and executing braking on the front wheels and braking on the rear wheels simultaneously to attain the driver-required braking torque in a state where the disconnector is connected.

The controlling of the braking on the front wheels and the braking on the rear wheels may include: comparing the driver-required braking torque with a torque at which the regenerative braking by the front wheel motor and the rear wheel motor is possible, which corresponds to the current vehicle speed; performing the regenerative braking by the front wheel motor and the rear wheel motor and attaining the driver-required braking torque by generating only a front-wheel regenerative braking torque and the rear-wheel regenerative braking torque, when the driver-required braking torque is equal to or less than the torque at which the regenerative braking by the front wheel motor and the rear wheel motor is possible.

In addition, the torque at which the regenerative braking by the front wheel motor and the rear wheel motor is possible may be a sum of a torque at which the regenerative braking by the front wheel motor is possible and the torque at which the regenerative braking by the rear wheel motor. The torque at which the regenerative braking by the front wheel motor is possible may be a value in accordance with a current vehicle speed and may be determined from a graph line showing the torque at which the regenerative braking by the front wheel motor is possible. The torque at which the regenerative braking by the rear wheel motor may be a value in accordance with the current vehicle speed, and may be determined from a graph line showing the torque at which the regenerative braking by the rear wheel motor is possible.

The controlling of the braking on the front wheels and the braking on the rear wheels may further include: comparing a front-wheel and rear-wheel hydraulic braking torque with a predetermined regenerative braking and hydraulic braking blending limit torque when the driver-required braking torque is greater than the torque at which the regenerative braking by the front wheel motor and the rear wheel motor is possible; and preforming the regenerative braking by the front wheel motor and the rear wheel motor and the front-wheel and rear-wheel hydraulic braking and attaining the driver-required braking torque, in response to determining that the front-wheel and rear-wheel hydraulic braking torque is less than the regenerative braking and hydraulic braking blending limit torque, in which the front-wheel and rear-wheel hydraulic braking torque may be obtained by subtracting the torque at which the regenerative braking by the front wheel motor and the rear wheel motor is possible, from the driver-required braking torque.

Further, the controlling of the braking on the front wheels and the braking on the rear wheels may include: limiting and maintaining the front-wheel regenerative braking torque to and as the regenerative braking and hydraulic braking blending limit torque while attaining the driver-required braking torque by performing the regenerative braking by the front wheel motor and the rear wheel motor and the front-wheel and rear-wheel hydraulic braking, when the front-wheel and rear-wheel hydraulic braking torque is equal to or greater than the regenerative braking and hydraulic braking blending limit torque.

In the method, while the driver-required braking torque is attained by generating only the rear-wheel regenerative braking torque, when the vehicle stability index increases with an increase in amount of brake pedal operation and reaches the reference value, the disconnector may be connected. In the limiting and maintaining of the front-wheel regenerative braking torque to and as the regenerative braking and hydraulic braking blending limit torque, the rear-wheel regenerative braking torque may be maintained as the rear-wheel regenerative braking torque at a point in time where the vehicle stability index reaches the reference value.

Additionally, while the driver-required braking torque is attained by generating only the rear-wheel regenerative braking torque, when the vehicle stability index increases with an increase in an amount of brake pedal operation and reaches the reference value, the disconnector may be connected. In the performing of the regenerative braking by the front wheel motor and the rear wheel motor and the front-wheel and rear-wheel hydraulic braking and the attaining of the driver-required braking torque, the rear-wheel regenerative braking torque may be maintained as the rear-wheel regenerative braking torque at a point in time where the vehicle stability index reaches the reference value.

When the disconnector is connected and on the basis of the pieces of information collected in the vehicle, it is determined that a state where the regenerative braking by the motor is possible is entered, the driver-required braking torque may be compared with the torque at which the regenerative braking by the front wheel motor and the rear wheel motor is possible. When the disconnector is connected, and, on the basis of the pieces of information collected in the vehicle, it is determined that the state where the regenerative braking by the motor is not possible is not entered, hydraulic braking control that attains the driver-required braking torque by generating only the front-wheel and rear-wheel hydraulic braking torque may be performed.

While the driver-required braking torque is attained by generating only the rear-wheel regenerative braking torque, when the vehicle stability index increases with an increase in an amount of brake pedal operation and reaches the reference value, the disconnector may be connected. In the attaining of the driver-required braking torque by generating only the front-wheel regenerative braking torque and the rear-wheel regenerative braking torque, the rear-wheel regenerative braking torque may be maintained as the rear-wheel regenerative braking torque at a point in time where the vehicle stability index reaches the reference value. The method may further include: performing the regenerative braking by the rear wheel motor and the front-wheel and rear-wheel hydraulic braking, and attaining the driver-required braking torque when the driver-required braking torque is greater than the torque at which the regenerative braking by the rear wheel motor is possible.

With a method of controlling braking of a vehicle according to the present disclosure, in a 2WD state where a disconnector is disconnected and where an auxiliary drive wheel is thus separated from a driving system, vehicle braking may be performed only with regenerative braking by a primary drive wheel motor during braking. Subsequently, the disconnector may be connected according to a vehicle stability state, and switching to a 4WD state may be executed. Then, braking may be performed simultaneously on the auxiliary drive wheel and the primary drive wheel. Therefore, the method may ensure the vehicle stability and braking performance and may contribute to an improvement in vehicle fuel efficiency by maximizing an amount of regenerative braking.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present invention, and wherein.

DETAILED DESCRIPTION

Figure 1A:
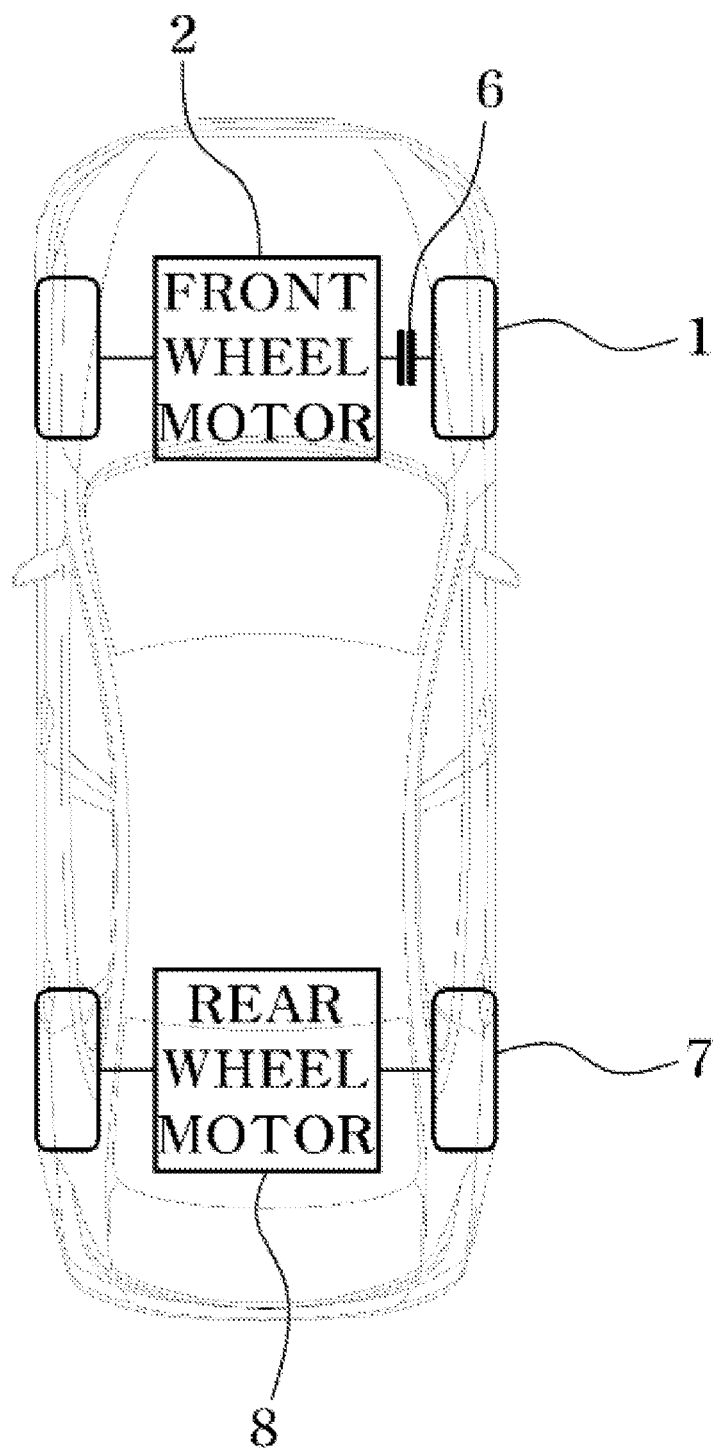
FIGS. 1A and 1B are diagrams, each illustrating a vehicle equipped with a front wheel drive motor, a rear wheel drive motor, and a disconnector according to the prior art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure will be described in detail below with reference to the accompanying drawings in such a manner that a person of ordinary skill in the art to which the present disclosure pertains is enabled to practice them without undue experimentation. However, the present disclosure is not limited to the exemplary embodiment that is described here and may be implemented into other exemplary embodiments.

When the expression "includes a certain constituent element" is used throughout the specification, unless otherwise described, this expression means "further includes any other constituent element", not "excluding any other constituent element".

The present disclosure relates to a method of controlling braking of a vehicle. Particularly, the present disclosure relates to a method of controlling braking of a vehicle that may include an independent driving unit configured to drive front wheels, an independent driving unit configured to drive rear wheels, and a connector that is installed in a driving shaft and makes and releases a connection for motive power transfer.

More particularly, according to the present disclosure, a method of controlling braking of a vehicle that is equipped with an independent driving unit configured to have a regenerative braking function is provided, and a method of controlling braking of a four-wheel-drive electric vehicle that is equipped with a disconnector for reducing drag loss on the auxiliary drive wheel side, as well as with a front wheel drive motor and a rear wheel drive motor.

In addition, according to the present disclosure, a method is provided to control braking of a four-wheel drive electric vehicle that are equipped with a motor drive for front wheels, a motor drive for rear wheels, and a disconnector, the method being capable of ensuring the vehicle stability and braking performance and increasing an amount of regenerative braking, during braking, and thus contributing to an improvement in vehicle fuel efficiency. According to the present disclosure, in a state where a disconnector is disconnected and where an auxiliary drive wheel is thus separated from a driving system, vehicle braking may be performed only with regenerative braking by a primary drive wheel motor during braking. Subsequently, the disconnector may be connected according to a vehicle stability state, and then, regenerative braking may be performed simultaneously on the auxiliary drive wheel and the primary drive wheel.

In the following description of exemplary embodiments, vehicles to which a method of controlling braking according to an exemplary embodiment of the present disclosure is applied are well-known four-wheel-drive electric vehicles that are each equipped with a front wheel drive motor, a rear wheel drive motor, and a disconnector. An e-4WD system and a configuration of a power train for the four-wheel-drive electric vehicle will be described below with reference to FIGS. 1A-1B and 2 of the prior art.

Figure 3:
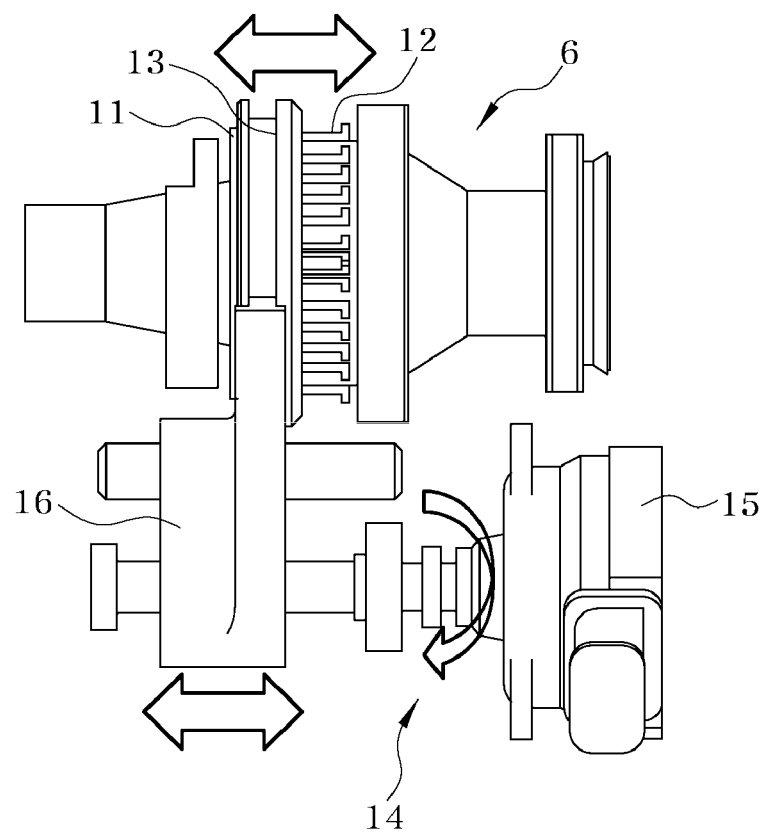
FIG. 3 is a diagram illustrating a configuration of the disconnector in the vehicle according to an exemplary embodiment of the present disclosure.

For reference, FIG. 3 is a diagram illustrating a configuration of the disconnector. A disconnector 6 may be installed on a driving shaft 5 between a decelerator 3 and a vehicle wheel (e.g., an auxiliary drive wheel) 1, more precisely, between a differential 4 and the vehicle wheel 1. The disconnector 6 may include constituent elements that make and release a connection for motive power transfer between an input shaft and an output shaft. An input shaft here of the disconnector 6 may be coupled to an output shaft of the differential 4, and an output shaft of the disconnector 6 may be coupled to the auxiliary drive shaft 1 side.

In the following description, the primary drive wheel and the auxiliary drive wheel are defined as described above, and the purpose of installation of, an installation position of, operation of, a function of, a role of, and the like, of the disconnector are the same as in the well-known four-wheel-drive electric vehicle described above. During four-wheel driving, a rotational force of a drive motor 2 may be transferred to the input shaft of the disconnector 6 through the decelerator 3 and the differential 4. In a connected state of the disconnector 6, the output shaft of the disconnector 6 may transfer the rotational force transferred to the input shaft thereof, to a drive wheel 1 (e.g., a front wheel, as an auxiliary drive wheel, in the following example).

During two-wheel driving in which an auxiliary drive wheel motor (e.g., a front wheel motor in FIGS. 1A-1B) is not driven, a reverse driving force is transferred from an auxiliary drive wheel 1 to the decelerator 3, and thus drag loss occurs. To prevent this, the disconnector 6 may be disconnection-operated to block motive power transfer between driving-system components, such as the decelerator 3 and the differential 4, and the auxiliary drive wheel 1. In addition, during regenerative braking by the auxiliary drive wheel motor (e.g., the front wheel motor in FIGS. 1A-1B), the disconnector 6 may be connected, and thus a rotational force of the auxiliary drive wheel (e.g., the front wheel in FIGS. 1A-1B) may be transferred to the motor.

According to the present disclosure, the disconnector 6, as illustrated in FIG. 3, may have the same configuration as a well-known dog clutch. With reference to FIG. 3, the disconnector 6 that is realized as the dog clutch may include a shaft gear 11 disposed on the input shaft to be rotated together with the input shaft, a hub 12 disposed on the output shaft to be rotated together with the output shaft, and a sleeve 13 combined with the hub 12 to move slidably in the axis direction and, at the same time, be rotated together with the hub 12.

The shaft gear 11 may be a spline-shaped gear that has teeth that are formed, lengthwise in the axis direction, on the circumferential surface thereof. The hub 12 may also have a spline-shaped gear that has teeth that are formed, lengthwise in the axis direction, on the circumferential surface thereof. In particular, the sleeve 13 may be combined with the shaft gear 11 and the hub 12 that each have teeth formed lengthwise in the axis direction on the circumferential surface, and that are each disposed to be inward. The sleeve 13 may be installed to be continuously rotated together with, and engaged, with the hub 12. The sleeve 13 may be moved slidably from the hub 12 toward the axis direction, and thus may be selectively engaged with or separated from the gear 11 based on a direction and position in which the sleeve 13 is moved.

Furthermore, the disconnector 6 may include a driving mechanism 14 that, as illustrated in FIG. 3, may be configured to move the sleeve 13 slidably from the hub 12 toward the axis direction to be engaged with or separated from the shaft gear 11. A configuration here of the driving mechanism 14 is already well-known to a person of ordinary skill in the art and therefore is not illustrated in detail in the drawings. However, as an example, the driving mechanism 14 may be configured to convert a rotational force of a disconnect motor 15 into a straightforward moving force through a screw, which is not illustrated, and a reciprocating element into which the screw is screwed (e.g., engaged), and the like, to move a fork 16 backward and forward, and thus to move the sleeve 13, with which the fork 16 is combined, slidably toward the axis direction.

On the other hand, in the four-wheel-drive electric vehicle, during braking, regenerative braking in which kinetic energy of the vehicle is recovered into electric energy through generation by the drive motor and in which a battery is thus charged with the resulting electric energy may also be performed. In addition to the regenerative braking, hydraulic braking (e.g., frictional braking) may be performed by a hydraulic braking device (e.g., a frictional braking device) that is installed in each vehicle wheel. The regenerative braking by the drive motor and the hydraulic braking by the hydraulic braking device may be performed individually or together on front wheels and rear wheels.

In an electric vehicle in which the regenerative braking and the hydraulic braking are performed, required deceleration D and a driver-required braking torque (e.g., a target braking force or a total braking force) are first determined based on a braking signal corresponding to a driver's braking operation (e.g., a driver's braking input or brake pedal engagement), for example, a signal of a brake pedal sensor (BPS) based on a brake pedal operation. Subsequently, division into a regenerative braking torque and a hydraulic braking torque (e.g., a frictional braking torque), which will add up to the driver-required braking torque, may be executed. In addition, when the regenerative braking torque (e.g., a regenerative braking force) and the hydraulic braking torque (e.g., a hydraulic braking force) are determined through the division, regenerative braking control by a motor and hydraulic braking control may be performed for generating the braking torques that results from the division.

According to the present disclosure, when a state where a particular regenerative braking condition is satisfied and where the regenerative braking by the motor is possible is entered, the regenerative braking, as described above, may be performed. Furthermore, the division into the regenerative braking torque and the hydraulic braking torque may be executed, and the regenerative braking and the hydraulic braking may be performed on all front wheels and rear wheels. Therefore, division into a front wheel braking torque and a rear wheel braking torque may also be executed.

In addition, traveling control and braking control of the four-wheel-drive electric vehicle may be performed under the cooperative control of multiple controllers. The multiple controllers may include a vehicle control unit (VCU) that is a high-level controller configured to execute a general vehicle operation, a brake control unit (BCU) configured to perform vehicle braking control and execute operation of a hydraulic braking device, a motor control unit (MCU) configured to execute a motor operation, and a battery management system (BMS) configured to collect information regarding a state of a battery and manage the battery.

The controllers may be configured to exchange information via a vehicle network (e.g., controller area network) for vehicle braking and perform cooperative control. This is also true in performing the braking control according to the present disclosure. For example, the vehicle controller may be configured to determine and output a regenerative braking torque command and execute regenerative operation of the drive motor using an inverter based on the regenerative braking torque command received from the vehicle controller. In addition, the vehicle controller may be configured to execute operations of connecting and disconnecting the disconnector 6.

In other words, when the vehicle controller outputs a control signal for connecting or disconnecting the disconnector 6, operation of the driving mechanism, specifically, the disconnector motor 15 that is an actuator in the driving mechanism may be operated based on the control signal. According to the control of the operation of the disconnector 15, the sleeve 13 may be moved slidably toward the axis direction between the shaft gear 11 and the hub 12, and thus the disconnector 6 may be connected or disconnected.

Figure 4:
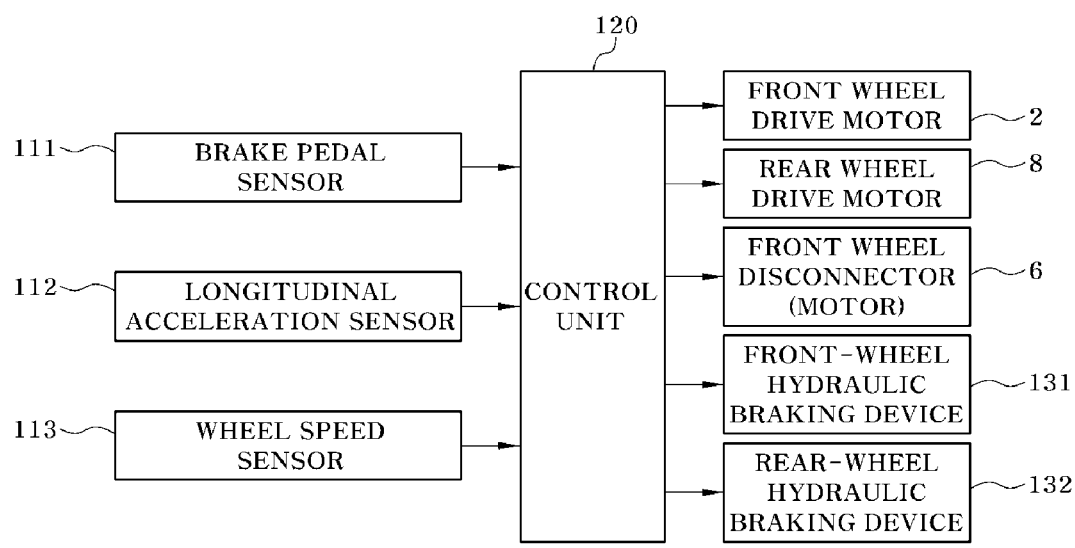
FIG. 4 is a block diagram illustrating a configuration of a system within the vehicle for performing braking control according to an exemplary embodiment of the present disclosure.

The method of controlling braking according to the present disclosure will be described in more detail below. FIG. 4 is a block diagram illustrating a configuration of a system within a vehicle for performing the braking control according to the present disclosure. In the following description, a front wheel drive motor 2 and a rear wheel drive motor 8 are referred to as "front wheel motor" and "rear wheel motor", respectively. Multiple controllers that are involved in a braking control process according to the present disclosure are collectively referred to as a controller 120, which is illustrated in FIG. 4. The controllers 120 may include a vehicle controller configured to perform cooperative control for braking, a brake controller, a motor controller, and a battery controller (configured to provide information regarding a state of charge (SOC) of a battery or the like).

Figure 1B:
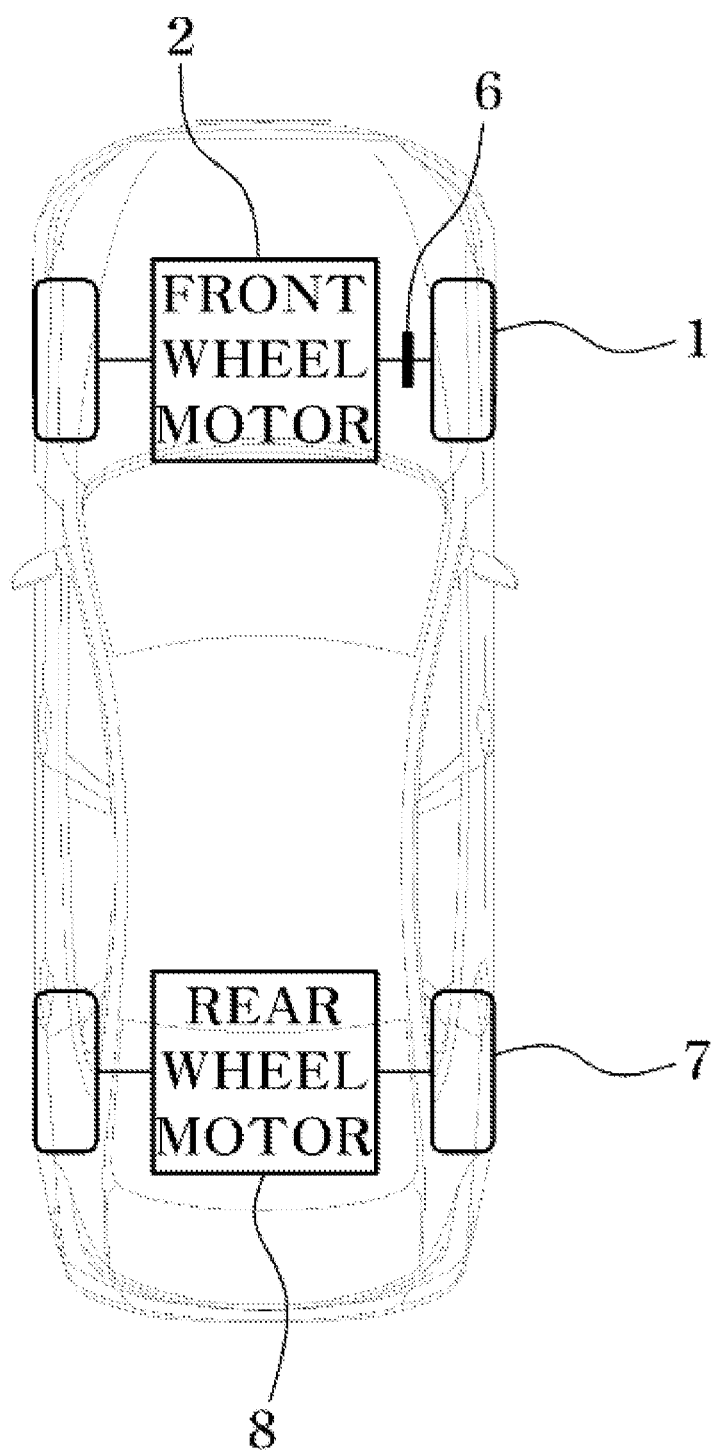
Figure 2:
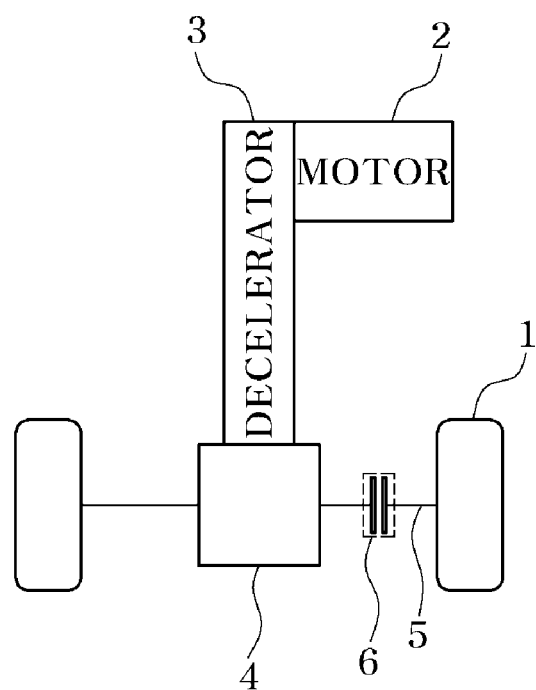
FIG. 2 is a diagram that more specifically illustrates a configuration of a power train on the auxiliary drive wheel side and a state where driving-system components are arranged, in the vehicle that is illustrated in FIGS. 1A and 1B according to the prior art.
Figure 5:
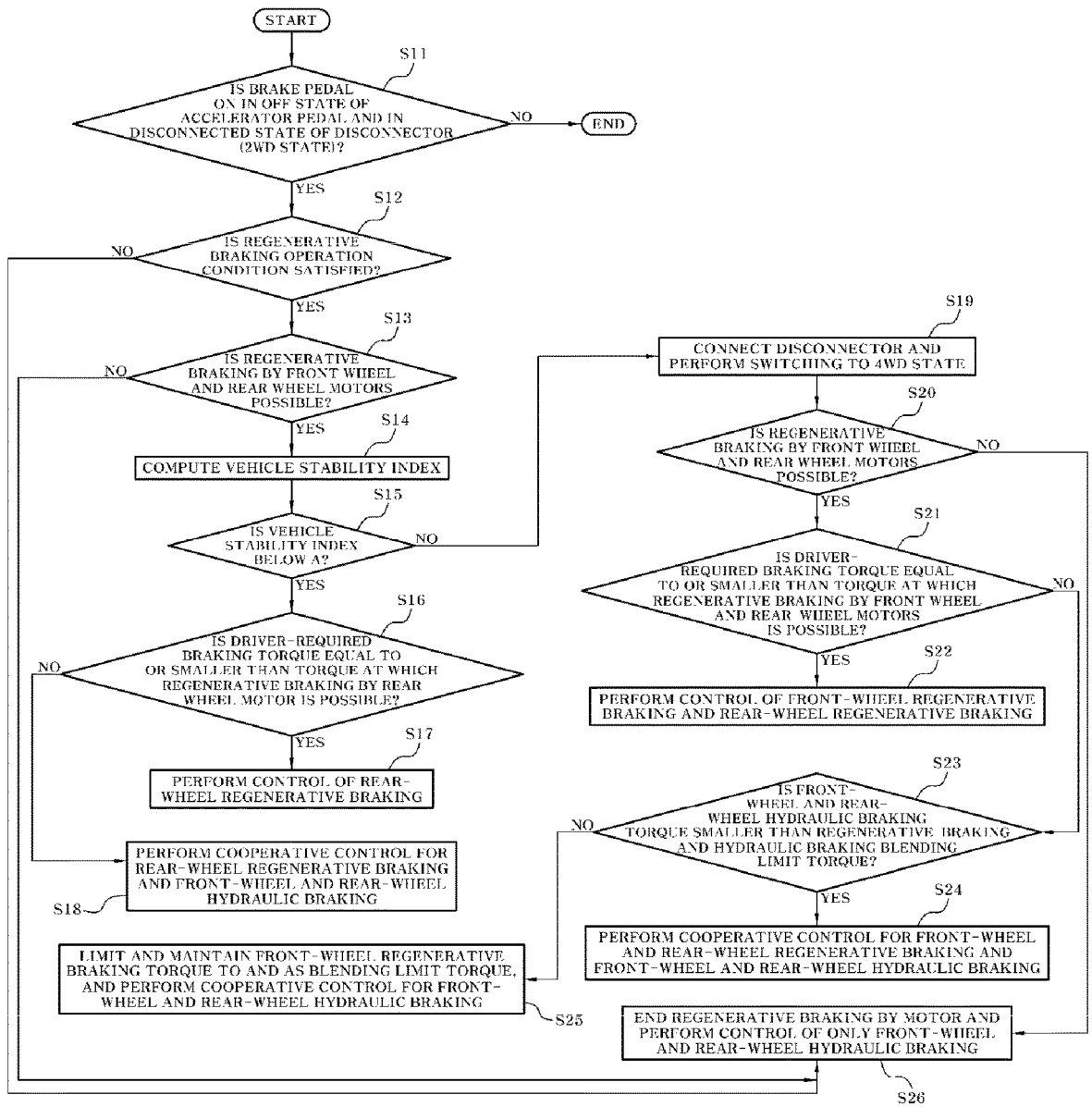
FIG. 5 is a flowchart illustrating a braking control process according to an exemplary embodiment of the present disclosure.

In addition, FIG. 5 is a flowchart illustrating the braking control process according to the present disclosure. First, when a driver releases an accelerator pedal in a four-wheel drive (4WD) electric vehicle that is equipped with the front wheel motor 2, the rear wheel motor 8, and a front wheel disconnector 6 (when the accelerator pedal is off or disengaged), a vehicle control unit (VCU) (whose reference number in FIG. 4 is "120") may be configured to disconnect (separates) the front wheel disconnector 6. Thus, the vehicle may coast in a 2WD state (this is true in a rear wheel drive state) as illustrated in FIG. 1A.

This may improve vehicle fuel efficiency since the front wheel disconnector 6 is in a disconnected state, a reverse driving force is transferred from a front wheel 1, which is an auxiliary drive wheel, to the decelerator 3, drag loss may be prevented from occurring. Since the front wheel 1 is separated from driving-system components, such as the front wheel motor 2, the decelerator 3, and the differential 4, when the vehicle coasts with an inertia force, a movement distance of the vehicle may be maximally increased.

Subsequently, while the vehicle travels in a state where the accelerator pedal is disengaged and where the front wheel disconnector 6 is disconnected, the brake controller may be configured to determine whether a brake pedal is in an ON state (e.g., engaged) (S11). In other words, while the vehicle coasts, when the driver depresses or engages the brake pedal (e.g., when the brake pedal is on), from a signal of a brake pedal sensor (BPS) 111, the brake controller (of which reference number in FIG. 4 is "120") may be configured to determine that braking or deceleration is in progress. Subsequently, based on the information collected in the vehicle, the brake controller may be configured to determine whether a current vehicle state satisfies a particular regenerative braking operation condition (S12).

The regenerative braking operation condition here may be a well-known condition. For example, the regenerative braking operation condition may be determined to be satisfied when one or several of or all of the following conditions are satisfied: the condition that a gearshift level is at a drive (D) position, the condition that a vehicle speed (obtained from a wheel speed sensor) is at or greater than a setting value, the condition that required deceleration (determined from a brake pedal sensor (BPS) signal value) is at or less than a setting value, the condition that an amount of brake pedal operation (the BPS signal value) is at or greater than a setting value, the condition that an amount of slipping of each vehicle wheel is at or less than a setting value, the condition that an anti-lock braking system (ABS) and an electronic stability control (ESC) do not operate, and the condition that a wheel speed sensor 113 and a hydraulic sensor (not illustrated) operate normally (e.g., without malfunction or failure).

Subsequently, based on the information collected in the vehicle, the vehicle controller may be configured to determine whether the vehicle enters a state in which the regenerative braking by the motor is possible (S13). The motor here may be the rear wheel motor 8 that is a primary drive wheel motor or may refer to both the rear wheel motor 8 and the front wheel motor 2 that is an auxiliary drive wheel motor. In particular, based on the information, such as a graph line showing motor torque-revolutions per minute (RPM), system efficiency, and the state of charge (SOC) of the battery, the vehicle controller may be configured to calculate an amount of possible regenerative braking and, then, from the calculated amount of possible regenerative braking, determine whether a state where the regenerative braking by the front wheel motor 2 and the rear wheel motor 8 is possible is entered.

The process of determining whether the state where the regenerative braking is possible is entered is a well-known process that has been performed in any regenerative braking vehicle, and therefore, a detailed description of a method of or a process of determining whether the state where the regenerative braking is possible is entered is omitted. In addition, the vehicle controller may be configured to transmit a result of the determination of whether the state where the regenerative braking is possible is entered, to the brake controller. In response to determining that the state where the regenerative braking by the motor is possible is entered, the brake may be configured to determine a vehicle stability index from the information collected in the vehicle, in response to receiving from the vehicle controller the result of the determination that the state where the regenerative braking by the motor is possible is entered.

When the brake controller does not receive from the vehicle controller the information that the regenerative braking by the front wheel motor 2 is possible, the brake controller may be configured to determine that the front wheel disconnector 6 is in the disconnected state (the 2WD state). Further, the brake controller may be configured to determine the vehicle stability index (S14), then compare the computed vehicle stability index with a preset reference value A (S15), and transmit a result of the determination to the vehicle controller. In particular, the brake controller may be configured to calculate the vehicle stability index from vehicle deceleration, an amount of rear wheel slipping, and a division ratio between a front wheel braking force and rear wheel braking force, using Equation 1.

$$\text{Vehicle Stability Index} = \text{Vehicle Deceleration} \times \text{Amount of Rear Wheel Slipping} \times \text{Division Ratio between Front Wheel Braking Force and Rear Wheel Braking Force} \qquad \text{Equation 1}$$

wherein the vehicle deceleration is actual vehicle deceleration that is measured in real time by a sensor in the vehicle, and is obtained from a signal of a longitudinal acceleration sensor 112 mounted in the vehicle.

In addition, the amount of rear wheel slipping in the vehicle may be obtained using a well-known calculation method, and a method of calculating the amount of wheel slipping is well-known to a person of ordinary skill in the art. Therefore, a detailed description of the method of calculating the amount of wheel slipping is omitted from the present specification. The division ratio between the front wheel braking force and the rear wheel braking force may be determined as a value of a ratio of a front wheel braking force to a rear wheel braking force (or a ratio of a front wheel braking torque to a rear wheel braking torque), and a calculation of the front wheel braking force and the rear wheel braking force may be made using Equation 2 and Equation 3, respectively.

$$B_f = \mu\left(W_f + W \times \frac{a}{g} \times \frac{h}{L}\right)$$

Equation 2

$$B_r = \mu\left(W_r - W \times \frac{a}{g} \times \frac{h}{L}\right)$$

Equation 3

Equation 2 and Equation 3 are equations for ideal braking division, where Bf denotes a front wheel braking force, Br denotes a rear wheel braking force, u denotes a road-surface friction coefficient, $W_f$ denotes a front wheel weight, $W_r$ denotes a rear wheel weight, a denotes vehicle deceleration, g denotes gravity acceleration, h denotes a vertical height of vehicle's center of gravity from the ground, and L denotes a wheel base. In Equations 2 and 3, the friction coefficient μ may be a predetermined constant, and the division ratio between the front wheel braking force and the rear wheel braking force is defined as the value of the ratio of the front wheel braking force to the rear wheel braking force.

In addition, the vehicle deceleration a is actual vehicle deceleration that is measured in real time by the longitudinal acceleration sensor 112, and the front wheel weight $W_f$, the rear wheel weight $W_r$, the height h of vehicle's center of gravity, and the wheel base L, which are pieces of data specific to a corresponding vehicle, are each input as predetermined values into the brake controller for storage, and are used later. According to the present disclosure, the greater a value of the vehicle stability index, the lower the stability of the vehicle. Moreover, the smaller the value of the vehicle stability index, the more stable state the vehicle has.

The reference value A is a value that may be determined through a process of performing prior testing and evaluation on the same type of vehicle. In particular, the reference value A is a value that may be determined and tuned after checking vehicle deceleration, a skidding state, a vehicle state, such as oversteer or understeer, the stability, and so on, under various conditions such as a low friction road, a downward-inclined road, and a curved road. A maximum stability index at which the vehicle stability is ensured may be set as the reference value A.

In response to determining in Step S15 that the vehicle stability index is less than the reference value A, the brake controller may be configured to compare the driver-required braking torque with a torque at which the regenerative braking by the rear wheel motor is possible, which corresponds to a current vehicle speed (S16). In response to determining that the driver-required braking torque is equal to or less than the torque at which the regenerative braking by the rear wheel motor is possible, which corresponds to the current vehicle speed, the brake controller may be configured to perform only the regenerative braking (e.g., rear-wheel regenerative braking) by the rear wheel motor 8 (S17). In other words, a single control for only the rear-wheel regenerative braking may be performed. The driver-required braking torque (e.g., a total braking torque) may be attained by generating only the rear-wheel regenerative braking torque, and front-wheel and rear-wheel hydraulic braking and rear-wheel hydraulic braking is not performed.

According to the present disclosure, the vehicle speed may be obtained in real time from a signal of the wheel speed sensor 113. When the driver-required braking torque is determined from a value of a signal of the brake pedal sensor 111, which represents the degree to which a maintains the engagement of a brake pedal in a normal vehicle, the driver-required braking torque has to be attained by adding the "front wheel braking torque" and the "rear wheel braking torque" or by adding the "regenerative braking torque and the "hydraulic braking torque". The driver-required braking torque may be divided into the front wheel braking torque and the rear-wheel braking torque that will add up to the driver-required braking torque.

Particularly, the front wheel braking torque may be attained by adding a "front-wheel regenerative braking torque" and a "front-wheel hydraulic braking torque", and the rear wheel braking torque may be attained by adding a "rear-wheel regenerative braking torque and a "rear-wheel hydraulic braking torque". Similarly, the regenerative braking torque may be attained by adding the "front-wheel regenerative braking torque" and the "rear-wheel regenerative braking torque", and the hydraulic braking torque may be attained by adding the "front-wheel hydraulic braking torque" and the "rear-wheel hydraulic braking torque".

The above Equations 2 and 3 are equations for the ideal braking division. The driver-required braking torque may be divided into the front wheel braking torque and the rear wheel braking torque using the equations 2 and 3. Alternatively, the regenerative braking torque may be divided into the front-wheel regenerative braking torque and the rear-wheel regenerative braking torque, and the hydraulic braking torque may be divided into the front-wheel hydraulic braking torque and the rear-wheel hydraulic braking torque.

To summarize, when, in Step S15 in the flowchart that is illustrated in FIG. 5, a vehicle-stable state where the vehicle stability index is less than the reference value A is entered and when, in Step S16, the driver-required braking torque is equal to or less than the torque at which the regenerative braking by the rear wheel motor is possible, which corresponds to the current vehicle speed, in Step S17, only the regenerative braking by the rear wheel motor 8 may be performed while the 2WD may be maintained without connecting the front wheel disconnector 6.

In other words, the driver-required braking torque is attained by generating only the rear-wheel regenerative braking torque, and at this time, the front wheel braking torque (e.g., the front-wheel regenerative braking torque+the front-wheel hydraulic braking torque) and the rear-wheel hydraulic braking torque are both at a value of "0". Then, although not illustrated in FIG. 5, after Step S17 is performed, the control process may return to Step S11.

Figure 6:
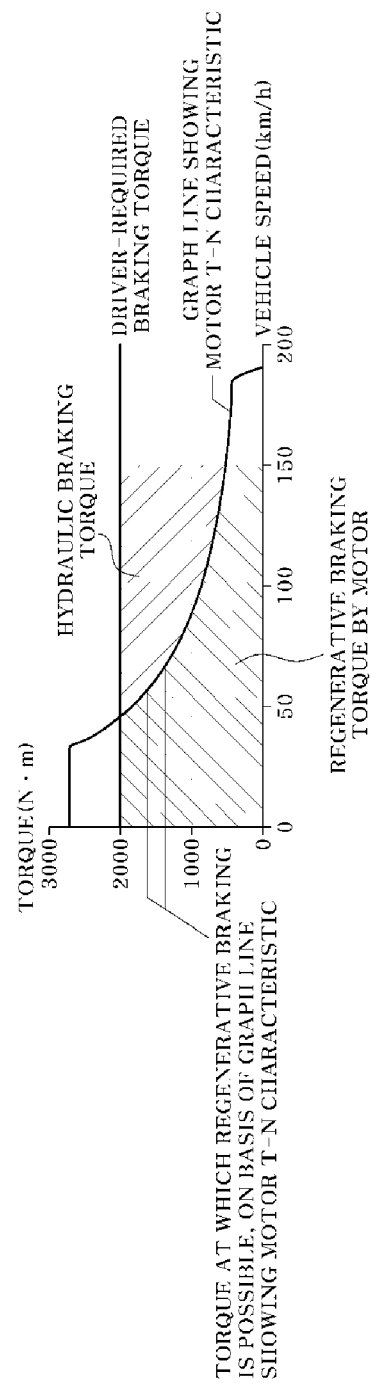
FIG. 6 is a diagram illustrating a graph line showing a motor T-N(torque-speed) characteristic that defines a value of a torque, in accordance with a vehicle speed, at which regenerative braking by the motor is possible, according to an exemplary embodiment of the present disclosure.

FIG. 6 is a diagram illustrating an example of a graph line showing a motor T-N(torque-speed) characteristic, which defines a value of a torque at which the regenerative braking by the motor is possible. The torque at which the regenerative braking is possible, which corresponds to the current vehicle speed, may be determined from the illustrated graph line showing the motor T-N characteristic.

The graph line showing the motor T-N characteristic defines an amount of possible regenerative braking torque that may be generated by a corresponding motor according to a vehicle speed. The amount of possible regenerative braking torque (e.g., the value of the torque at which the regenerative braking is possible) at the current vehicle speed is limited by the graph line showing the motor T-N characteristic.

FIG. 6, shows that the value of the torque at which the regenerative braking is possible is determined, as a value in accordance with the vehicle speed, by the graph line showing the motor T-N characteristic. The graph line showing the motor T-N characteristic may be used in determining a value of the torque at which the regenerative braking by the front wheel motor and the rear wheel motor is possible.

In other words, according to the present disclosure, a graph line showing a rear wheel motor T-N characteristic (which is used in Step S16), which defines the value of the torque, in accordance with the vehicle speed, at which the regenerative braking by the rear wheel motor is possible, and a graph line showing a front wheel motor T-N characteristic (which is used in Step S21), which defines the value of the torque, in accordance with the vehicle speed, at which the regenerative braking by the front wheel motor is possible, are provided and may be used.

With reference to FIG. 6, when the driver-required braking torque is equal to or less than the torque, in accordance with the current vehicle speed, at which the regenerative braking by the motor is possible and which is determined based on the graph line showing the motor T-N characteristic, the driver-required braking torque may be attained by generating only the regenerative braking torque by the motor. However, when the driver-required braking torque is greater than the torque, in accordance with the current vehicle speed, at which the regenerative braking by the motor is possible and which is determined based on the graph line showing the motor T-N characteristic, the regenerative braking torque may be limited to the torque at which the regenerative braking by the motor is possible, which is indicated by the graph line showing the motor T-N characteristic.

In particular, the hydraulic braking torque has to be generated to attain the braking torque by which the torque at which the regenerative braking is possible is exceeded. To attain the driver-required braking torque, the hydraulic braking has to be performed along with the regenerative braking by the motor. In an example in FIG. 6, when the driver-required braking torque is about 2000 Nm at a vehicle speed of about 150 km/h, at an initial stage, the hydraulic braking torque has to be generated much more than the regenerative braking torque, to attain the driver-required braking torque. Subsequently, the lower the vehicle speed, the more hydraulic braking torque may be decreased, and, at the same time, the more regenerative braking torque may be increased.

Further, in the example in FIG. 6, when the vehicle speed is equal to or less than approximately about 50 km/h, the driver-required braking torque may be attained by generating only the regenerative braking by the motor. Therefore, the hydraulic braking is unnecessary. According to the present disclosure, the graph line showing the motor T-N characteristic, as illustrated in FIG. 6, specifically, the graph line showing the rear wheel motor T-N characteristic that defines the value of the torque, in accordance with the vehicle speed, at which the regenerative braking by the rear wheel motor is possible, may also be input in advance into the brake controller for storage and may be used in Step S16 in FIG. 5.

Along with this, in a similar manner as in the example in FIG. 6, the graph line showing the front wheel motor T-N characteristic that defines the value of the torque, in accordance with the vehicle speed, at which the regenerative braking by the front wheel motor is possible may be input in advance into the brake controller for storage and may be used in Step S21 in FIG. 5. If in Step S16 in FIG. 5, the driver-required braking torque is greater than the torque at which the regenerative braking by the rear wheel motor is possible, which corresponds to the current vehicle speed, in Step S18, in addition to the regenerative braking by the rear wheel motor 8, the front-wheel hydraulic braking and the rear-wheel hydraulic braking by hydraulic braking device 131 and 132 are performed additionally, and thus the driver-required braking torque may be attained by adding up the regenerative braking torque by the rear wheel motor 8 and the front-wheel and rear-wheel hydraulic braking torque.

Particularly, the division into the front-wheel hydraulic braking torque and the rear-wheel hydraulic braking torque may be executed according to the division ratio between the front wheel braking force and the rear wheel braking force, which is obtained from Equations 2 and 3, and, according to the present disclosure, this may also be applied in the division into the front wheel braking torque and the rear wheel braking torque. In addition, according to the present disclosure, the regenerative braking and the hydraulic braking may be performed under the cooperative control of the vehicle controller, the brake controller, and the motor controller. The hydraulic braking may be performed by the brake controller configured to drive of the hydraulic braking devices 131 and 132. When the vehicle controller generates and outputs the regenerative braking torque command, the regenerative braking may be performed by the motor controller configured to execute the regenerative operation of the corresponding motors 2 and 8 according to the regenerative braking torque command received from the vehicle controller.

On the other hand, when in Step S15 in FIG. 5, the brake controller may be configured to determine that the vehicle stability index is at or greater than the reference value A and a result of the determination may be transmitted to the vehicle controller, based on the result of the determination, which is received from the brake controller, the vehicle controller may connect the front wheel disconnector 6 and thus switching to the 4WD (S19).

In the following description, a "4WD state" refers to a state of a vehicle driving system where the disconnector (e.g., the front wheel disconnector 6) installed on the auxiliary drive wheel side (e.g., the front wheel side) for the vehicle braking is connected for the vehicle braking, and a "2WD state" refers a state of the vehicle driving system where the disconnector 6 is disconnected (e.g., separated) for braking. After switching to the 4WD state, to attain the driver-required braking torque, the braking on the front wheels and the braking on the rear wheels may be controlled simultaneously, and thus the braking force may be generated on all the front and rear wheels.

Accordingly, first, in Step S20, in the same manner as in Step S12, the vehicle controller may be configured to determine whether the state where the regenerative braking by the front wheel motor 2 and the rear wheel motor 8 is possible is entered and transmit a result of the determination to the brake controller. Subsequently, when the brake controller receives from the vehicle controller the result of the determination that the state where the regenerative braking by the front wheel motor 2 and the rear wheel motor 8 is possible is entered, in Step S21 in FIG. 5, the brake controller may be configured to compare the driver-required braking torque with the torque at which the regenerative braking by the front wheel motor and the rear wheel motor is possible, which corresponds to the current vehicle speed.

At this point, the torque at which the regenerative braking by the front wheel motor and the rear wheel motor is possible may be a sum of the torque at which the regenerative braking by the front wheel motor, which corresponds to the current vehicle speed, and the torque at which the regenerative braking by the rear wheel motor, which corresponds to the current vehicle speed. In particular, the torque at which the regenerative braking by the front wheel motor is possible may be determined, as a value corresponding to the current vehicle speed, from the graph line showing the front wheel motor T-N characteristic, and the torque at which the regenerative braking by the rear wheel motor is possible may be determined, as the value corresponding to the current vehicle speed, from the graph line showing the rear motor T-N characteristic.

When in Step S21 in FIG. 5, the brake controller determines that the driver-required braking torque is equal to or less than the torque at which the regenerative braking by the front wheel motor and the rear wheel motor is possible, the brake controller may be configured to transmit a result of the determination, and the vehicle controller and the motor controller accordingly may be configured to perform the cooperative control and thus perform the regenerative braking by the front wheel motor 2 and the rear wheel motor 8 (S22). In particular, only the regenerative braking control by the front wheel motor 2 and the rear wheel motor 8 may be performed, and the front-wheel hydraulic braking and the rear-wheel hydraulic braking by the hydraulic braking devices 131 and 132 are not performed.

Although not illustrated in FIG. 5, when the brake pedal is maintained in an ON state (e.g., engaged state) while performing Step S22, the method may return to Step S20, and then switch from Step S20 to Step S26 or switch from Step S21 to Step S23.

Figure 7:
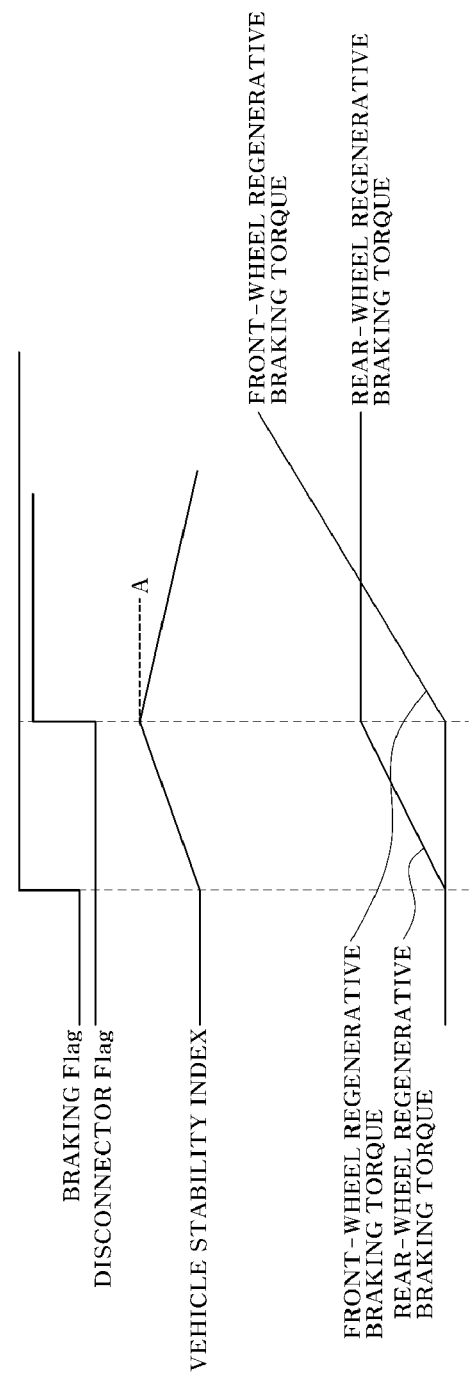
FIG. 7 is a diagram illustrating that when a vehicle stability index reaches a reference value A, the disconnector is connected and where front-wheel regenerative braking and rear-wheel regenerative braking are then performed simultaneously an exemplary embodiment of the present disclosure.

FIG. 7 is a diagram illustrating a state where, when the vehicle stability index reaches the reference value A, the disconnector 6 is connected and where, in Step S22, the front-wheel regenerative braking and the rear-wheel regenerative braking are then performed simultaneously. FIG. 7 illustrates that, in a state (a "braking flag") where the driver continuously engages the brake pedal and in a state where the vehicle stability index reaches the reference value A, the disconnector 6 may be connected (a "disconnector flag") and that, in this case, the regenerative braking by the front wheel motor 2 and the regenerative braking by the rear wheel motor 8 may be performed simultaneously.

In FIG. 7, the "the front-wheel regenerative braking torque" indicates a state of the regenerative braking by the front wheel motor and the "rear-wheel regenerative braking torque" indicates a state of the regenerative braking by the rear wheel motor. As shown in FIG. 7, a maximum amount of the rear-wheel regenerative braking torque may be limited to and maintained as a value of the rear-wheel regenerative braking torque at a point in time where the vehicle stability index reaches the reference value A. According to the present disclosure, through a real-world vehicle evaluation test, the reference value A may be determined as a maximum value of the vehicle stability index at which the vehicle stability is secured when the braking is performed only with the regenerative braking by the rear wheel motor 8.

In addition, as illustrated in FIG. 7, when the vehicle stability index reaches the reference value A, the front wheel disconnector 6 may be connected and switching to the 4WD state may be executed. Then, the regenerative braking (e.g., the front-wheel regenerative braking torque) by the front wheel motor 2 may be additionally caused to occur. At this time, the driver-required braking torque may be attained by adding up the regenerative braking torque (e.g., the rear-wheel regenerative braking torque) by the rear wheel motor 8 and the regenerative braking torque (e.g., the front-wheel regenerative braking torque) by the front wheel motor 2. In other words, the rear-wheel regenerative braking torque may be limited to and maintained as the value thereof at the point in time where the vehicle stability index reaches the reference value A and, at the same time, a front-wheel regenerative braking torque that is as much as a braking torque required to attain the driver-required braking torque may be additionally generated. Thus, the driver-required braking torque may be attained.

If the 4WD state where the front wheel disconnector 6 is connected and a state where conditions in Step S20 and Step S21 in FIG. 5 are both satisfied are entered, the driver further engages the brake pedal and thus the driver-required braking torque may be increased. At this time, as illustrated in FIG. 7, the rear-wheel regenerative braking torque may be maintained constant, but the front-wheel regenerative braking torque may gradually increase to attain the driver-required braking torque. In addition, after in Step S19, the front wheel disconnector 6 may be connected and the state of the vehicle driving system may be switched from the 4WD state, within a corresponding braking cycle, the vehicle controller no longer performs vehicle braking and maintains the 4WD state until the vehicle comes to a stop. This is done to increase a feeling of smooth starting when the vehicle re-accelerates after the vehicle braking is no longer performed or after the vehicle stops to a stop.

Further, with reference to FIG. 7, when the condition in Step S15 is satisfied without immediately connecting the front wheel disconnector 6 when braking occurs, that is, when the vehicle stability index reaches the reference value A, the front wheel disconnector 6 may be connected. At this point, the reason for not immediately connecting the front wheel disconnector 6 as soon as the braking occurs is because in terms of fuel efficiency, it is more advantageous to brake the vehicle only with the regenerative braking by the rear wheel motor 8 in a state where the vehicle stability index is less than the reference value A, for example, in an area where low deceleration of the vehicle is performed. This is further true in the case of an e-4WD system in which the rear wheel motor 8 has higher inverter efficiency than the front wheel motor 2. In such a case, in terms of vehicle fuel efficiency, it is more advantageous to generate as much regenerative braking as possible with the rear wheel motor 8.

On the other hand, when in Step S21 in FIG. 5, the brake controller may be configured to determine that the driver-required braking torque is greater than the torque at which the regenerative braking by the front wheel motor and the rear wheel motor is possible, which corresponds to the current vehicle speed, in Step S23, the brake controller may be configured to compare a front-wheel and rear-wheel hydraulic braking torque with a predetermined regenerative braking and hydraulic braking blending limit torque. In particular, the front-wheel and rear-wheel hydraulic braking torque refers to a sum of the front-wheel hydraulic braking torque and the rear-wheel hydraulic braking torque and may be obtained as a value that results from subtracting the torque at which the regenerative braking by the front wheel motor and the rear wheel motor is possible, which corresponds to the current vehicle speed, from the driver-required braking torque.

In response to determining in Step S23 that the front-wheel and rear-wheel hydraulic braking torque is less than the regenerative braking and hydraulic braking blending limit torque, the brake controller may be configured to transmit a result of the determination to the vehicle controller. In Step S24, the vehicle controller and the motor controller accordingly may be configured to perform the cooperative control and thus perform the regenerative braking by the front wheel motor 2 and the rear wheel motor 8 (e.g., perform the front-wheel regenerative braking and the rear-braking regenerative braking). Particularly, to attain the driver-required braking torque, a regenerative braking torque that is as much as the torque at which the regenerative braking by the front wheel motor and the rear wheel motor is possible, which corresponds to the current vehicle speed, may be generated by the regenerative braking by the front wheel motor and the regenerative braking by the rear wheel motor.

In addition, in Step S24, the brake controller may be configured to operate the hydraulic braking devices 131 and 132 and thus perform the front-wheel hydraulic braking and the rear-wheel hydraulic braking together. Particularly, a hydraulic braking torque that is as much as a braking torque that results from subtracting the regenerative braking torque (e.g., a sum of the front-wheel regenerative braking torque and the rear-wheel regenerative braking torque) by the front wheel motor 2 and the rear wheel motor 8 from the driver-required braking torque may be generated through the hydraulic braking devices 131 and 132 and may be applied to the front wheel 1 and the rear wheel 7.

On the other hand, when in Step S23, the front-wheel and rear-wheel hydraulic braking torque is greater than the regenerative braking and hydraulic braking blending limit torque, in Step S25, the front-wheel regenerative braking torque may be limited to and maintained as the blending limit torque and, at the same time, the hydraulic braking torque may be increased. Thus, a hydraulic braking torque that is as much as a braking torque that is required to attain the driver-required braking torque, which is unable to be generated as only the regenerative braking torque, may be generated.

Particularly, the rear-wheel regenerative braking torque may be limited to and maintained as the value thereof at the point in time where the vehicle stability index reaches the reference value A. The blending limit torque may be provided as a maximum value of the front-wheel regenerative braking torque. To summarize, in Step S25, the rear-wheel regenerative braking torque may be limited to and maintained as the value thereof at the point in time where the vehicle stability index reaches the reference value A, and the front-wheel regenerative braking torque may be limited to and maintained as the blending limit torque.

In addition, a value that results from subtracting the front-wheel and rear-wheel regenerative braking torque from the driver-required braking torque may be divided into the front-wheel hydraulic braking torque and the rear-wheel hydraulic braking torque, and at this time, the front-wheel regenerative braking torque and the rear-wheel regenerative braking torque may both be maintained constant. Therefore, the front-wheel and rear-wheel hydraulic braking torques change in a manner that corresponds to an increase and a decrease in the driver-required braking torque. In other words, when the driver-required braking torque increases gradually, the regenerative braking torque may remain constant without any change. Therefore, the hydraulic braking torque may also gradually increase.

Although not illustrated in FIG. 5, when the brake pedal is maintained in an ON state while performing Step S25, the method may return to Step S20, and then Step S20 and subsequent steps may be repeated continuously. According to the present disclosure, the regenerative braking and hydraulic braking blending may include a situation where the regenerative braking torque increases with a decrease in the hydraulic braking torque increase or decreases with an increase in the hydraulic braking torque in such a manner that the regenerative braking torque and the hydraulic braking torque add up to the driver-required braking torque.

In addition, the regenerative braking and hydraulic braking blending limit torque refers to a maximum amount of the regenerative braking torque that is at the level where responsiveness, followability, linearity, and the like are satisfactory and where deceleration loss and comfortableness thus do not occur when the hydraulic braking torque is adjusted correspondingly and changeably according to the degree to which the regenerative braking torque changes. For example, when a vehicle is being driven (e.g., without error), a vehicle rolls on (e.g., is driven on) a low-friction road and thus wheel slipping increases rapidly, an ABS hydraulic control has to be performed to prevent wheel lock. However, to perform ABS operation and hydraulic control, first of all, the regenerative braking torque by the motor has to be rapidly replaced with the hydraulic braking torque.

As described above, to perform the ABS operation and the hydraulic control, when the regenerative braking torque is rapidly replaced with the hydraulic braking torque, the maximum amount of the regenerative braking torque by the motor, that is, the regenerative braking and hydraulic braking blending limit torque may be set up to a level where the responsiveness and linearity of the hydraulic braking torque may be secured.

On the other hand, in response to determining in Step S11 in FIG. 5 that the regenerative braking operation condition is not satisfied or in response to determining in Steps S12 and S20 that a state where the regenerative braking by the front wheel motor 2 and the regenerative braking by the rear wheel motor 8 are not possible is entered, in Step S26, the vehicle controller no longer performs both the regenerative braking by the front wheel motor and the regenerative braking by the rear wheel motor.

In addition, the vehicle controller may be configured to transmit a result of the determination to the brake controller, and the brake controller accordingly may be configured to perform front-wheel hydraulic braking control and rear-wheel hydraulic braking control. Thus, the driver-required braking torque may be attained by generating only the front-wheel and rear-wheel hydraulic braking torque instead of the regenerative braking torque by the motor.

The above state where the regenerative braking by the front wheel motor and the regenerative braking by the rear wheel motor are not possible may be a state where the driver-required braking torque is beyond a condition range where regenerative braking is possible. Therefore, in response to determining that this state is entered, the regenerative braking by any motor is no longer performed, and only the front-wheel hydraulic braking and the rear-wheel hydraulic braking may be performed instead of the regenerative braking.

Figure 8:
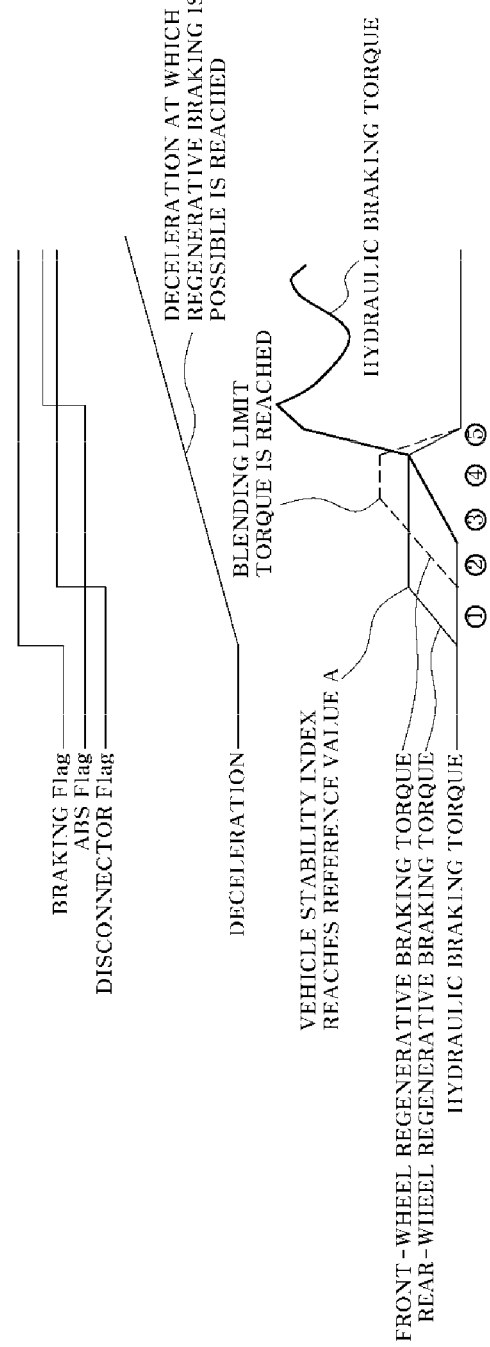
FIG. 8 is a diagram illustrating a stepwise braking torque state in a braking control process according to an exemplary embodiment of the present disclosure.

FIG. 8 is a diagram illustrating a stepwise braking torque state in the braking control process according to the present disclosure. First, a ① section in FIG. 8 is a section where the single control of the rear-wheel regenerative braking, as in Step S17 in FIG. 5, is performed prior to the connecting of the disconnector 6 in the area where the low deceleration of the vehicle is performed.

Next, a ② section in FIG. 8 is a section where only the regenerative braking control by the front wheel motor 2 and the regenerative braking control by the rear wheel motor 8 in Step S22 are performed instead of the hydraulic braking after the connecting of the disconnector 6, in an area where a low-middle deceleration of the vehicle is performed.

In the ② section in FIG. 8, as the amount of the brake pedal operation and the driver-required braking torque gradually increase, the front-wheel regenerative braking torque may increase, but the rear-wheel regenerative braking torque may be limited to and maintained as the value thereof at the point in time where the vehicle stability index reaches the reference value A (refer to the description with reference to FIG. 7).

A ③ section in FIG. 8 is a section where the cooperative control of the regenerative braking by the front wheel motor 2 and the regenerative braking by the rear wheel motor 8, and of the front-wheel hydraulic braking and the rear-wheel hydraulic braking, as in Step S24 in FIG. 5, may be performed in the connected state of the disconnector 6.

A ④ section in FIG. 8 is a cooperative control section where, in a connected state of the disconnector 6 and in a middle-high deceleration state of the vehicle, as in Step S25 in FIG. 5, the front-wheel regenerative braking torque may be limited to and maintained as the blending limit torque, and, at the same time, the front-wheel hydraulic braking and the rear-wheel hydraulic braking may be performed to attain the driver-required braking torque.

In the ④ section in FIG. 8, the rear-wheel regenerative braking torque may be limited to and maintained as the value thereof at the point in time where the vehicle stability index reaches the reference value A, and thus the respective values of the front-wheel and rear-wheel regenerative braking torques may both be maintained constant. Therefore, when the driver-required braking torque increases, the hydraulic braking torque also increases.

A ⑤ section in FIG. 8 is a section where, in the connected state of the disconnector 6 and in a high deceleration state of the vehicle, as in Step S26 in FIG. 5, the regenerative braking is no longer performed and where only the front-wheel hydraulic braking and the rear-wheel hydraulic braking control are performed.

FIG. 8, shows that the regenerative braking torques are all replaced with the hydraulic braking torques before the ABS operation starts in the ⑤ section, and that only the hydraulic braking control is performed instead of the regenerative braking after the ABS operates for preventing the wheel lock. In addition, FIG. 8 shows that the front-wheel regenerative braking torque may be limited to and maintained as the blending limit torque and the rear-wheel regenerative braking toque may be limited to and maintained as the value thereof at the point in time where the vehicle stability index reaches the reference value A, in the ④ section in FIG. 8 in such a manner that, when the ABS operates, the hydraulic braking torque is rapidly replaced with the regenerative braking torque.

Figure 9:
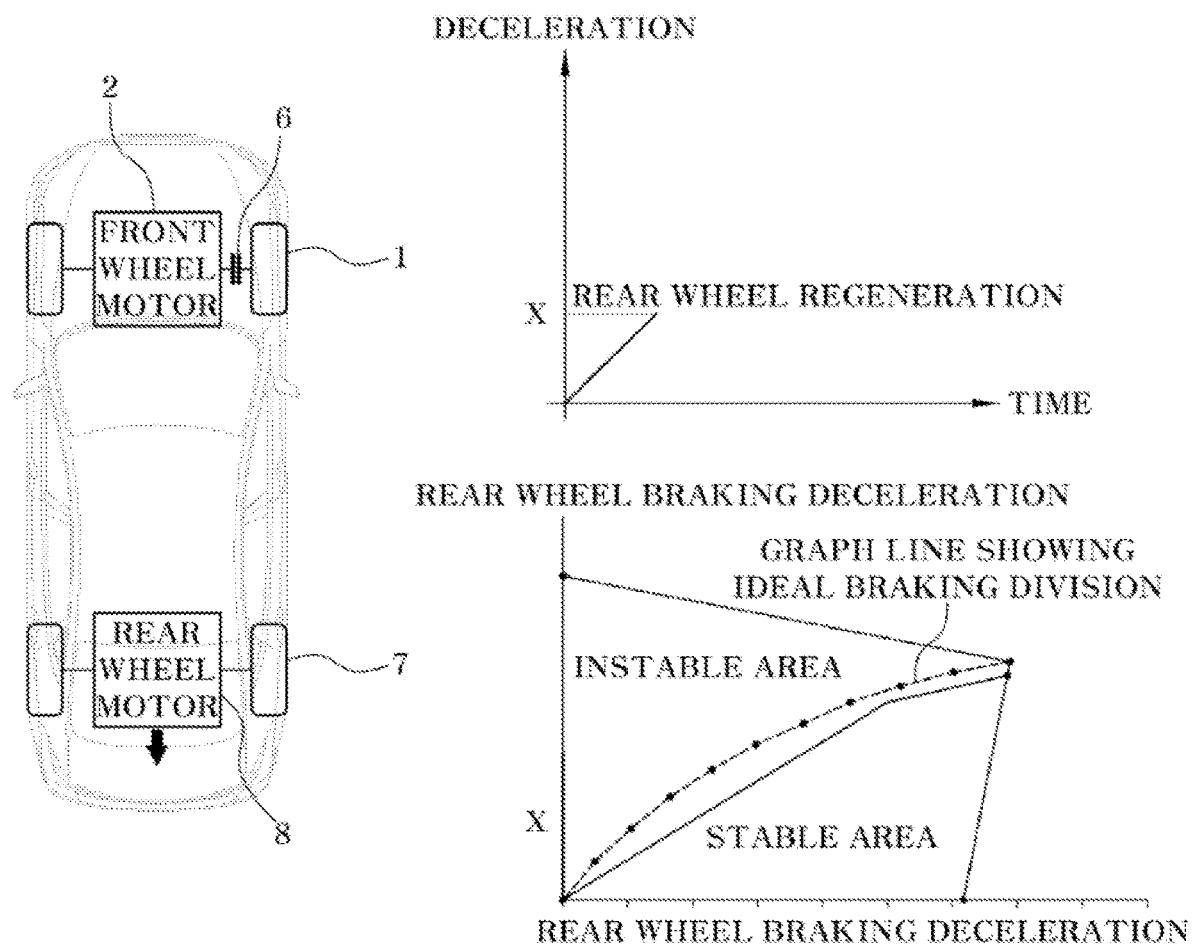
FIGS. 9 to 12 are diagrams, each of which distinguishably illustrates a change in vehicle deceleration and a state of each braking control phase, which result when a driver performs operation of a brake pedal according to an exemplary embodiment of the present disclosure.

Further, FIGS. 9 to 12 are diagrams, each of which distinguishably illustrates a change in the vehicle deceleration and a state of each braking control phase, which result when the driver slowly depresses or engages the brake pedal up to a specific position, gradually increasing an amount of pedal operation (e.g., gradually increases an engagement amount). FIG. 9 corresponds to the ① section in FIG. 8 where the braking is performed using only the rear wheel motor 8, and illustrates a section where, in an initial stage of the brake pedal operation, in a low deceleration state of the vehicle, only the regenerative braking by the rear wheel motor 8 is preformed prior to the connecting of the disconnector 6 (Steps S17 in FIG. 5).

In the state in FIG. 9, the front wheel disconnector 6 is in a non-connected state. Therefore, the regenerative braking by the front wheel motor 2 is unable to be performed, and neither the hydraulic braking by the front-wheel hydraulic braking devices 131, nor the hydraulic braking by the rear-wheel hydraulic braking device 132 may be performed. In addition, the regenerative braking torque by the rear wheel motor 8 increases gradually with an increase in the amount of the pedal operation. Along the way, only the rear-wheel regenerative braking torque occurs until the vehicle stability index reaches the reference value A.

A lower right portion of FIG. 9 illustrates a graph line showing the ideal braking division. The X-axis represents front wheel braking deceleration by the front wheel braking force, and the Y-axis represents rear wheel braking deceleration by the rear wheel braking force. As shown in the lower portion of FIG. 9, the rear wheel braking deceleration by the rear wheel braking force occurs until the vehicle stability index reaches the reference value A. The rear wheel braking deceleration is above the graph line showing the ideal braking division. This indicates that the rear wheel braking deceleration is in an unstable area.

Since the rear wheel braking deceleration is in the unstable area, through the real-world vehicle evaluation test, the reference value A of the vehicle stability index is set to the level where the vehicle stability may be secured on a low-friction road, an inclined road, a curved road, and the like, based on the vehicle deceleration, the amount of rear wheel slipping, and the division ratio between the front wheel braking force and the rear wheel braking force.

Figure 10:
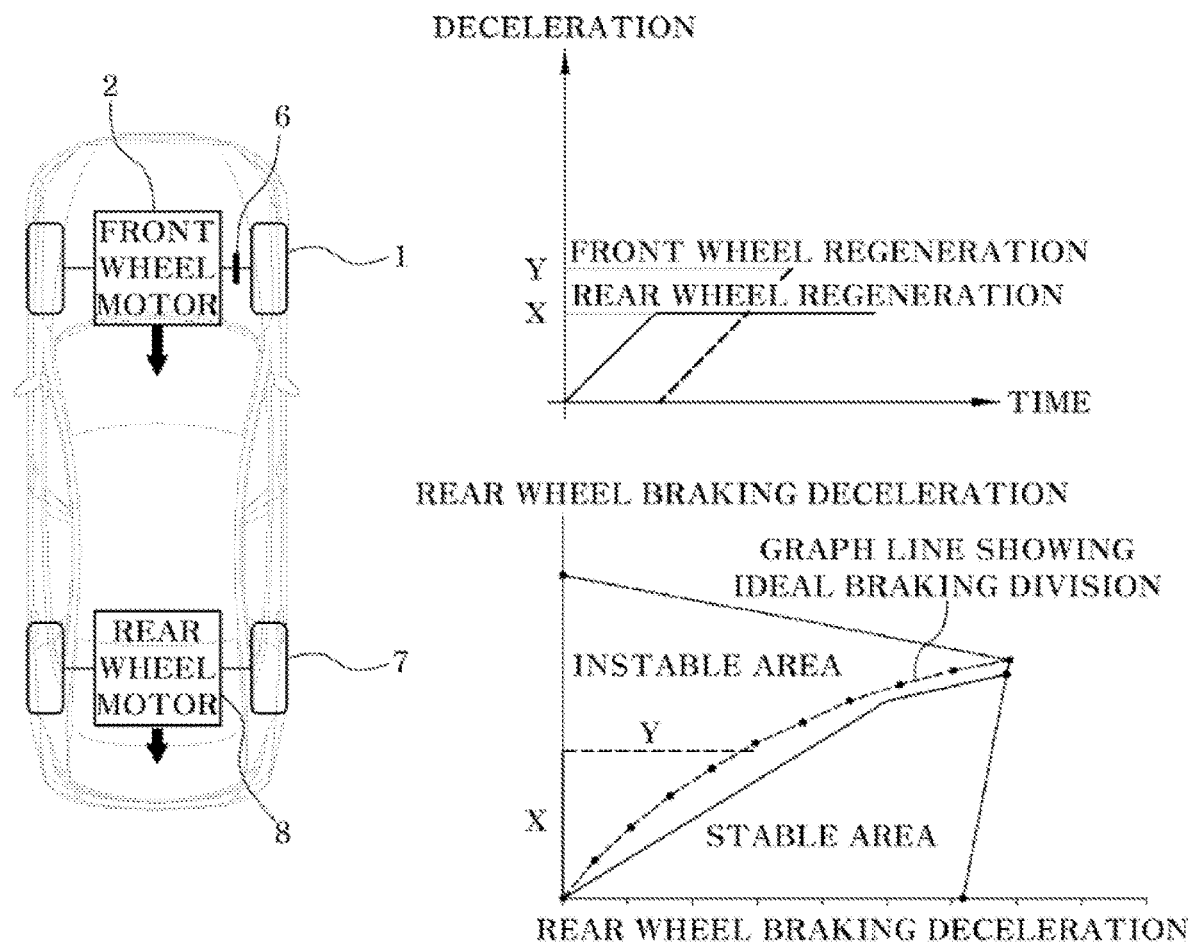

FIG. 10 corresponds to the ② section in FIG. 8 and represents a state that temporally follows the state in FIG. 9. FIG. 10 illustrates a section where the front-wheel regenerative braking and the rear-wheel regenerative braking are performed together instead of the hydraulic braking after the connecting of the disconnector 6 in a low-middle deceleration state of the vehicle (Step S22 in FIG. 5). In the state in FIG. 10, as illustrated above, the rear-wheel regenerative braking torque is limited to and maintained as the value thereof at the point in time where the vehicle stability index reaches the reference value A.

The connector 6 may be connected at the point in time where the vehicle stability index reaches the reference value A, and the regenerative braking may be performed by each of the front wheel motor 2 and the rear wheel motor 8. At this time, the hydraulic braking is not performed. With reference to the upper right portion of FIG. 10, only with the rear-wheel regenerative braking force, deceleration occurs, and only the rear-wheel regenerative braking is performed until deceleration X at the point in time where the vehicle stability index reaches the reference value A occurs.

Subsequently, the front-wheel regenerative braking force occurs additionally, and deceleration Y at a point in time where the front-wheel regenerative braking torque reaches the blending limit torque occurs additionally (deceleration=X+Y). In addition, in a lower right portion of FIG. 10, the deceleration X occurs by the rear-wheel regenerative braking force, and then, only with the front-wheel regenerative braking force, the deceleration Y occurs additionally. At this time, only the front wheel braking deceleration increases. This is represented by a horizontal graph line in the lower right portion of FIG. 10.

Figure 11:
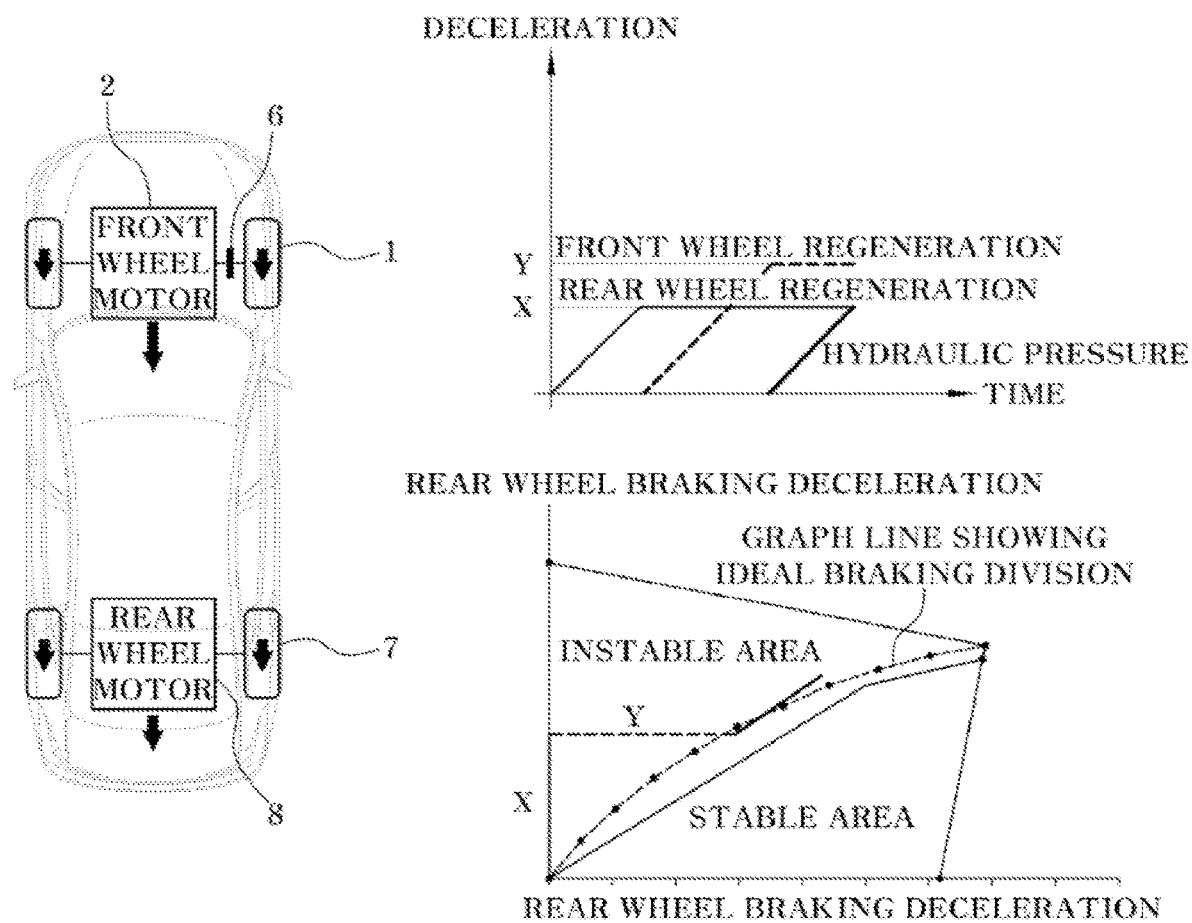

The state in FIG. 10 refers a situation where the front wheel braking force is added. Therefore, as the graph line showing the ideal braking division is approached, the vehicle may be gradually stabilized. As the front-wheel regenerative braking force increases, the braking stability increases. A state in FIG. 11 corresponds to the ④ section in FIG. 8 and illustrates a state that temporally follows the state in FIG. 10. FIG. 11 illustrates that Step S25 in FIG. 5 is performed in the connected state of the disconnector 6 and in the middle-high deceleration state of the vehicle.

In the state in FIG. 11, in the connected state of the disconnector 6 and in the middle-high deceleration state of the vehicle, as in Step S25 in FIG. 5, the front-wheel regenerative braking torque may be limited to and maintained as the blending limit torque, and at the same time, the front-wheel hydraulic braking and the rear-wheel hydraulic braking may be performed in such a manner to attain the driver-required braking torque. At this time, the rear-wheel regenerative braking torque may be maintained as the value thereof at the point in time where the vehicle stability index reaches the reference value A.

With reference to an upper right portion of FIG. 11, only the rear-wheel regenerative braking may be performed until the deceleration X occurs, the front-wheel regenerative braking and the rear-braking regenerative braking may both be performed until deceleration X+Y occurs, and the hydraulic braking may be performed additionally in a state where the regenerative braking is maintained, to obtain additional deceleration, after the deceleration X+Y is reached (e.g., the front-wheel hydraulic braking and the rear-wheel hydraulic braking are performed simultaneously).

In addition, as in the upper right portion of FIG. 11, the front-wheel hydraulic braking and the rear-wheel hydraulic braking may be simultaneously added after the deceleration X+Y occurs. This is represented by a graph line that is inclined in one direction other than the horizontal and vertical directions. At this time, since a braking division state is similar to a state presented by the graph line showing the ideal braking division, the braking stability of the vehicle may be secured.

Figure 12:
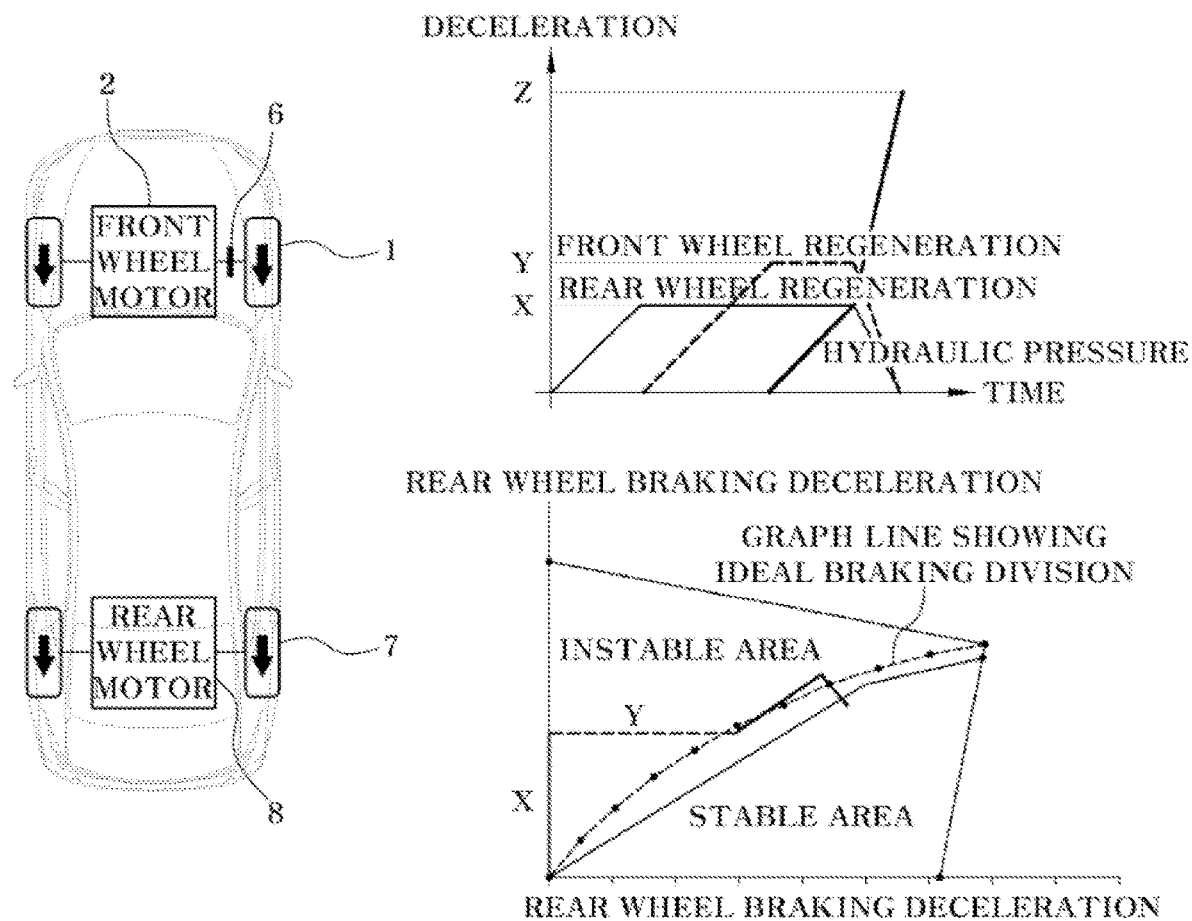

Then, FIG. 12 illustrates a state that temporally follows the state in FIG. 11, and illustrates a state where, in the section ⑤ in FIG. 8, in the high deceleration state of the vehicle and in the connected state of the disconnector 6, the regenerative braking is no longer performed and where only the front-wheel hydraulic braking and the rear-wheel hydraulic braking control are performed (e.g., the control phrase in Step S26 in FIG. 5). After deceleration Z (e.g., a condition for maximum deceleration), the front-wheel regenerative braking and the rear-braking regenerative braking may both end, and the front-wheel hydraulic braking and the rear-wheel hydraulic braking may be performed instead.

A lower right portion of FIG. 12 shows that the regenerative braking force by any motor disappears, that only the front-wheel hydraulic braking and the rear-wheel hydraulic braking force are generated, and that the braking division state is thus similar to a state represented by a graph line showing a real-world braking division, which indicates a more stable area than the state represented by the graph line showing the ideal braking division. Thus, the regenerative braking force disappears, and the braking division state enters the more stable area.

Figure 13:
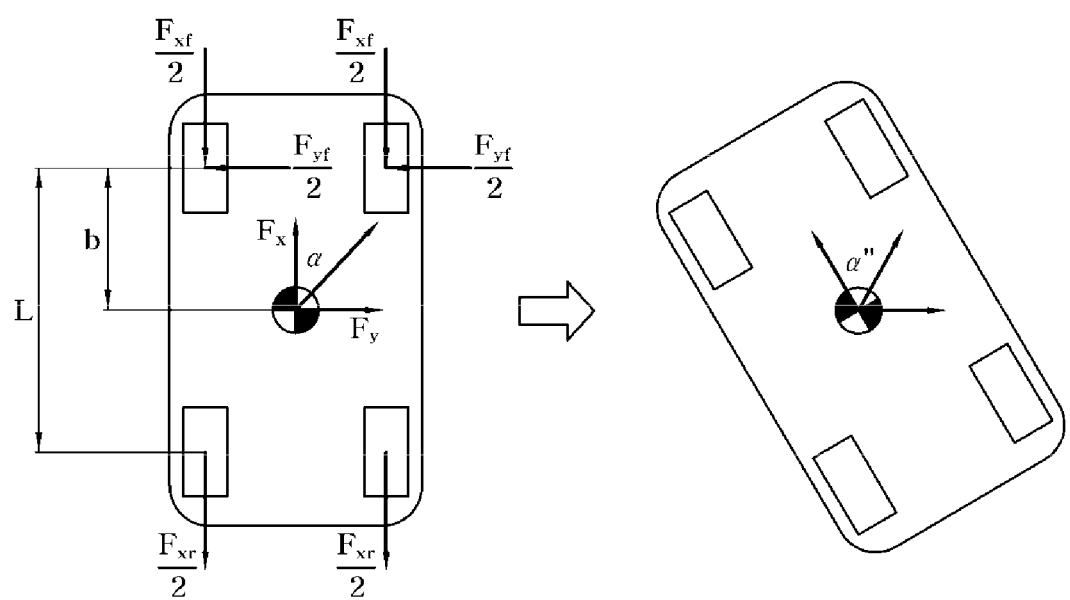
FIG. 13 is a reference diagram describing a behavior of the vehicle when wheel lock in a rear wheel occurs due to an excessive rear wheel braking force an exemplary embodiment of the present disclosure.

FIG. 13 is a reference diagram for describing a behavior of the vehicle when the wheel lock in the rear wheel occurs due to an excessive braking force. When the rear-wheel braking force is excessive, since the wheel lock occurs on the rear wheel, a lateral force does not act on the rear wheel, and thus only a braking force $F_{xr}$ acts on the rear wheels, whereas a braking force $F_{xf}$ and a lateral force $F_{yf}$ act on the front wheels.

In particular, an inertial force $F_x$ and a lateral force $F_y$, as repulsive forces against the braking force and the lateral force, respectively, act on the vehicle's center of gravity in the longitudinal direction and the transverse direction, respectively. A longitudinal-direction resultant force acting on the vehicle has forces and a moment that are parallel, but a longitudinal-direction force $F_y$ forms a moment of "$F_y \times b$" with respect to the vehicle' center of gravity. When due to this moment, the vehicle turns in the longitudinal direction, an angle α between the inertial force acting on the center of gravity and the resultant force increases. Accordingly, a yaw phenomenon increases in magnitude and the braking stability of the vehicle decreases.

The exemplary embodiment of the present disclosure is described in detail above, but this does not impose a limit on the claimed scope of the present disclosure. Various modifications and improvements that a person of ordinary skill in the art makes using the basic concept of the present disclosure that is defined in the following claims are also included in the claimed scope of the present disclosure.

What is claimed is:

1. A method of controlling braking of a vehicle having a first independent driving unit configured to drive front wheels, a second independent driving unit configured to drive rear wheels, and a disconnector that is installed in a driving shaft and makes and releases a connection for motive power transfer, the method comprising:
   determining, by a controller, a current vehicle stability index based on information collected within the vehicle being driven in a state where the disconnector is disconnected to release the connection for the motive power transfer;
   connecting, by the controller, the disconnector in response to determining that the determined vehicle stability index is equal to or greater than a preset reference value;
   keeping, by the controller, the disconnector disconnected in response to determining that the determined vehicle stability index is smaller than a preset reference value; and
   performing, by the controller, regenerative braking for all of the front and rear wheels of the vehicle, or for either the front wheels or the rear wheels based on a controlled state of the disconnector;
   wherein the vehicle is a four-wheel-drive electric vehicle that has a front wheel motor and a rear wheel motor configured to independently drive the front wheels and the rear wheels, respectively, and the disconnector is installed on a front wheel driving shaft of the vehicle, wherein the vehicle is driven only through the front wheel motor and the rear wheel motor without an internal combustion engine;
   determining, by the controller, whether a brake pedal is operated while the vehicle is driven in a state where the disconnector is disconnected to release the connection for the motive power transfer;
   determining, by the controller, the current vehicle stability index based on the information collected within the vehicle and comparing the determined vehicle stability index with the preset reference value, in response to determining that the brake pedal is operated,
   comparing, by the controller, a driver-required braking torque with a torque at which regenerative braking by the rear wheel motor is possible, which corresponds to a current vehicle speed, when the determined vehicle stability index is less than the preset reference value;
   performing, by the controller, the regenerative braking by the rear wheel motor and attaining the driver-required braking torque by generating only a rear-wheel regenerative braking torque, when the driver-required braking torque is equal to or less than the torque at which the regenerative braking by the rear wheel motor is possible;

connecting, by the controller, the disconnector when the determined vehicle stability index is at or greater than the reference value; and operating, by the controller, braking on the front wheels and braking on the rear wheels simultaneously to attain the driver-required braking torque in a state where the disconnector is connected;

wherein the operating of the braking on the front wheels and the braking on the rear wheels includes:

comparing, by the controller, the driver-required braking torque with a torque at which the regenerative braking by the front wheel motor and the rear wheel motor is possible, which corresponds to the current vehicle speed; and performing, by the controller, the regenerative braking by the front wheel motor and the rear wheel motor and attaining the driver-required braking torque by generating a front-wheel regenerative braking torque and the rear-wheel regenerative braking torque, when the driver-required braking torque is equal to or less than the torque at which the regenerative braking by the front wheel motor and the rear wheel motor is possible.

2. The method according to claim 1, wherein the vehicle stability index is calculated from vehicle deceleration, an amount of rear wheel slipping, and a division ratio between a front wheel braking force and a rear wheel braking force, using Equation 1:

Equation 1: Vehicle stability index=Vehicle Deceleration×Amount of Rear Wheel Slipping×Division Ratio between Front Wheel Braking Force and Rear Wheel Braking Force wherein the vehicle deceleration is current real-world vehicle deceleration that is measured using a sensor, and the division ratio between the front wheel braking and the rear wheels braking wheel is a value of a ratio of the front wheel braking force to the rear wheel braking force.

3. The method according to claim 1, wherein the torque at which the regenerative braking by the rear wheel motor is possible is a value in accordance with the current vehicle speed.

4. The method according to claim 1, wherein:

the torque at which the regenerative braking by the front wheel motor and the rear wheel motor is possible is a sum of a torque at which the regenerative braking by the front wheel motor is possible and the torque at which the regenerative braking by the rear wheel motor is possible, the torque at which the regenerative braking by the front wheel motor is possible is a value in accordance with a current vehicle speed and is decided from a graph line showing the torque at which the regenerative braking by the front wheel motor is possible, and the torque at which the regenerative braking by the rear wheel motor is a value in accordance with the current vehicle speed, and is determined from a graph line showing the torque at which the regenerative braking by the rear wheel motor is possible.

5. The method according to claim 1, wherein the operating the braking on the front wheels and the braking on the rear wheels, further includes:

comparing, by the controller, a front-wheel and rear-wheel hydraulic braking torque with a predetermined regenerative braking and hydraulic braking blending limit torque when the driver-required braking torque is greater than the torque at which the regenerative braking by the front wheel motor and the rear wheel motor is possible; and preforming, by the controller, the regenerative braking by the front wheel motor and the rear wheel motor and the front-wheel and rear-wheel hydraulic braking and attaining the driver-required braking torque, when the front-wheel and rear-wheel hydraulic braking torque is less than the regenerative braking and hydraulic braking blending limit torque, wherein the front-wheel and rear-wheel hydraulic braking torque is obtained by subtracting the torque at which the regenerative braking by the front wheel motor and the rear wheel motor is possible, from the driver-required braking torque.

6. The method according to claim 5, wherein the operating the braking on the front wheels and the braking on the rear wheels, further includes:

performing, by the controller, the regenerative braking by the front wheel motor and the rear wheel motor and the front-wheel and rear-wheel hydraulic braking to achieve the driver-required braking torque when the front-wheel and rear-wheel hydraulic braking torque is equal to or greater than the regenerative braking and hydraulic braking blending limit torque; and limiting, by the controller, the front-wheel regenerative braking torque to the regenerative braking and hydraulic braking blending limit torque and maintaining the front-wheel regenerative braking torque as the regenerative braking and hydraulic braking blending limit torque.

7. The method according to claim 6, wherein while the driver-required braking torque is attained by generating only the rear-wheel regenerative braking torque, when the vehicle stability index increases with an increase in amount of brake pedal operation and reaches the reference value, the disconnector is connected, and wherein in the limiting and maintaining of the front-wheel regenerative braking torque to and as the regenerative braking and hydraulic braking blending limit torque, the rear-wheel regenerative braking torque is maintained as the rear-wheel regenerative braking torque at a point in time where the vehicle stability index reaches the reference value.

8. The method according to claim 5, wherein while the driver-required braking torque is attained by generating only the rear-wheel regenerative braking torque, when the vehicle stability index increases with an increase in an amount of brake pedal operation and reaches the reference value, the disconnector is connected, and wherein in the preforming of the regenerative braking by the front wheel motor and the rear wheel motor and the front-wheel and rear-wheel hydraulic braking and the attaining of the driver-required braking torque, the rear-wheel regenerative braking torque is maintained as the rear-wheel regenerative braking torque at a point in time where the vehicle stability index reaches the reference value.

9. The method according to claim 1, wherein in the state where the disconnector is connected, and based on the information collected within the vehicle, the controller determines that a state where the regenerative braking by the front wheel motor and the rear wheel motor is possible is entered, the driver-required braking torque is compared with the torque at which the regenerative braking by the front wheel motor and the rear wheel motor is possible.

10. The method according to claim 9, wherein in the state where the disconnector is connected, and based on the information collected within the vehicle, the controller determines that the state where the regenerative braking by the front wheel motor and the rear wheel motor is possible is entered, hydraulic braking control that attains the driver-required braking torque by generating only the front-wheel and rear-wheel hydraulic braking torque is performed.

11. The method according to claim 1, wherein while the driver-required braking torque is attained by generating only the rear-wheel regenerative braking torque, when the vehicle stability index increases with an increase in amount of brake pedal operation and reaches the reference value, the disconnector is connected, and wherein in the attaining of the driver-required braking torque by generating only the front-wheel regenerative braking torque and the rear-wheel regenerative braking torque, the rear-wheel regenerative braking torque is maintained as the rear-wheel regenerative braking torque at a point in time where the vehicle stability index reaches the reference value.

12. The method according to claim 1, further comprising:
performing, by the controller, the regenerative braking by the rear wheel motor and the front-wheel and rear-wheel hydraulic braking, and attaining the driver-required braking torque when the driver-required braking torque is greater than the torque at which the regenerative braking by the rear wheel motor is possible.

13. A system of controlling braking of a vehicle having a first independent driving unit configured to drive front wheels, a second independent driving unit configured to drive rear wheels, and a disconnector that is installed in a driving shaft and makes and releases a connection for motive power transfer, the system comprising:
a memory configured to store program instructions; and
a processor configured to execute the program instructions, the program instructions when executed configured to:
determine a current vehicle stability index based on information collected within the vehicle being driven in a state where the disconnector is disconnected to release the connection for the motive power transfer;
connect the disconnector in response to determining that the determined vehicle stability index is equal to or greater than a preset reference value,
keep the disconnector disconnected in response to determining that the determined vehicle stability index is smaller than a preset reference value, and
operate a brake controller to perform regenerative braking for all of the front and rear wheels of the vehicle, or for either the front wheels or the rear wheels based on a controlled state of the disconnector,
wherein the vehicle is a four-wheel-drive electric vehicle that has a front wheel motor and a rear wheel motor configured to independently drive the front wheels and the rear wheels, respectively, and the disconnector is installed on a front wheel driving shaft of the vehicle, wherein the vehicle is driven only through the front wheel motor and the rear wheel motor without an internal combustion engine,
wherein the processor is further configured to:
determine, whether a brake pedal is operated while the vehicle is driven in a state where the disconnector is disconnected to release the connection for the motive power transfer;
determine the current vehicle stability index based on the information collected within the vehicle and comparing the determined vehicle stability index with a preset reference value, in response to determining that the brake pedal is operated,
compare a driver-required braking torque with a torque at which regenerative braking by the rear wheel motor is possible, which corresponds to a current vehicle speed, when the determined vehicle stability index is less than the preset reference value;
perform the regenerative braking by the rear wheel motor and attaining the driver-required braking torque by generating only a rear-wheel regenerative braking torque, when the driver-required braking torque is equal to or less than the torque at which the regenerative braking by the rear wheel motor is possible,
connect the disconnector when the determined vehicle stability index is at or greater than the reference value; and
operate braking on the front wheels and braking on the rear wheels simultaneously to attain the driver-required braking torque in a state where the disconnector is connected;
wherein the operating of the braking on the front wheels and the braking on the rear wheels includes, by the processor:
comparing, by the processor, the driver-required braking torque with a torque at which the regenerative braking by the front wheel motor and the rear wheel motor is possible, which corresponds to the current vehicle speed; and
performing, by the processor, the regenerative braking by the front wheel motor and the rear wheel-motor and attaining the driver-required braking torque by generating a front-wheel regenerative braking torque and the rear-wheel regenerative braking torque, when the driver-required braking torque is equal to or less than the torque at which the regenerative braking by the front wheel motor and the rear wheel motor is possible.

* * * * *